United States Patent [19]

Altenburger

[11] 4,059,733
[45] Nov. 22, 1977

[54] CALL DISTRIBUTOR FOR INCREASING SWITCHING SYSTEM CALL TERMINATION RATE

[75] Inventor: Otto Altenburger, Rochester, N.Y.

[73] Assignee: Stromberg-Carlson Corporation, Rochester, N.Y.

[21] Appl. No.: 638,443

[22] Filed: Dec. 8, 1975

[51] Int. Cl.² .............................................. H04Q 3/47
[52] U.S. Cl. ................................................ 179/18 ET
[58] Field of Search .................... 179/18 E, 22, 18 ET

[56] References Cited

U.S. PATENT DOCUMENTS

| | | | |
|---|---|---|---|
| 3,417,205 | 12/1968 | Warman et al. | 179/22 |
| 3,500,442 | 3/1970 | Warman | 179/18 E |
| 3,532,828 | 10/1970 | Schneider | 179/18 E |
| 3,733,439 | 5/1973 | Verhille et al. | 179/18 E |

Primary Examiner—Thomas W. Brown
Attorney, Agent, or Firm—Sherman & Shalloway

[57] ABSTRACT

A system and methods are disclosed in which two telephone calls are terminated simultaneously provided that one call is a local call and the second call is a trunk call and further provided that the local call and trunk call originate in separate line units. This is made possible by dividing a central office telephone switching system into two halves wherein each half includes both number translator circuits and code translator circuits and wherein each half includes both local register groups and trunk register groups. An allotter alternates between the register groups in each half of the circuit while indexing the register groups in order to match a local call placed in one-half of the circuit with a trunk call placed in the other half of the circuit for simultaneous termination.

2 Claims, 14 Drawing Figures

CALL DISTRIBUTOR FOR INCREASING SWITCHING SYSTEM CALL TERMINATION RATE

BACKGROUND OF THE INVENTION

1. Field of the Invention

This invention relates to a central office telephone switching system. More particularly, this invention relates to methods of and apparatus for monitoring telephone calls within a central office telephone switching system in such a way as to efficiently utilize the system.

2. Technical Consideration and Prior Art

Generally, when a telephone subscriber has finished a call he replaces his handset which indicates to a central office telephone switching system that this subscriber's call must be released within the system.

Heretofore, many central office switching systems have been able to terminate only one call at a time. Since switching systems must be designed to handle the volume of telephone calls generated during periods of peak telephone activity, it is necessary to provide sufficient switching capacity to accommodate a larger number of terminations. This capacity is not utilized during periods of low telephone activity so it is, in effect, wasted during those times. Furthermore, the additional capacity necessary for periods of peak activity is expensive to provide and maintain and consequently results in higher subscriber costs.

The central office switching systems with which the instant invention is concerned are in essence divided in half with two substantially identical switching circuits interconnected with one another. Each half of the circuit has a separate group of line units associated therewith which are connected to local telephones. Also connected to the circuit are outgoing trunks which transmit calls from the central office switching system to other remote central office systems. According to the teachings of the prior art, telephone calls terminated in such a central office were terminated one at a time in spite of the existence of separate number translator and code translator circuits. The inventor of the instant invention realized that the capacity of the system could be drastically increased if a way could be found to utilize both halves of the system so as to terminate two calls simultaneously.

Since there are more telephone calls terminated during periods of peak telephone traffic, there are more telephone calls available to the system for termination. Consequently, the system always has a large selection of calls during peak periods which can be in some way matched for simultaneous termination. Keeping in mind that there are local calls and trunk calls made by the system and that subscriber telephones are grouped in separate line units, there are different types of calls which may be terminated during periods of peak traffic. Since the system cannot terminate two similar calls simultaneously, the inventor of the instant invention has modified both the system and the use of the system to take advantage of the diversity of calls therewithin so as to terminate two calls simultaneously.

In accordance with the principles of the instant invention, two calls can be terminated by the central office simultaneously provided one call is a local call and the second call is a trunk call and further provided that the calls originated in separate line units or rather separate halves of the central office switching system.

OBJECTS OF THE INVENTION

It is the object of the instant invention to provide methods of and apparatus for increasing the capacity of a central office switching system by terminating two calls simultaneously within the system during periods of peak telephone traffic, when there is a large selection of calls which can be matched for simultaneous termination.

It is a further object of the instant invention to increase the capacity of a central office switching system without drastically modifying existing designs for such switching systems.

It is still an additional object of the instant invention to provide a central office telephone switching system which terminates two calls simultaneously provided one call is a local call and the second call is a trunk call and further provided that these calls are originated in separate line units of the system.

It is still yet an additional object of the instant invention to increase the capacity of existing central office switching circuit designs by approximately 75%.

SUMMARY OF THE INVENTION

In view of these and other objects, the instant invention contemplates an electronic telephone switching system which includes first and second line units for connecting local telephones to the system, and groups of incoming trunks for connecting remote telephone switching systems to the system. Associated with the first and second line units are controls which include: a line marker, service link network controls, junctors, ringing controls and registers. Associated with the incoming trunks are controls, which include: an incoming trunk scanner, incoming trunk markers, trunk service link network controls, and junctor/trunk link network controls. The number translator circuits are associated with all of the line units, and the code translator circuits are associated with all trunk calls. Only one register (within a group of a supergroup) at one time is connected to said number translator circuits for temporarily storing numbers of local telephone calls to be terminated, and only one register (within a group of a supergroup) at one time is connected to the code translator circuits for transmitting routing information for trunk calls. A register group allotter means alternates between registers within different supergroups, in order to find a request for terminating a local call in a register and a request for terminating a trunk call in a register, so that the local call and trunk call may be terminated simultaneously. The local call and trunk call, however, must have originated in separate groups of line units associated with separate halves of the switching system.

The instant invention also contemplates a method of terminating telephone calls in an electronic telephone switching system wherein two calls are terminated simultaneously. According to the method, one call must be a local call and the second call a trunk call, provided that the local call and trunk call originate in separate groups of line units associated with separate halves of the switching system.

DETAILED DESCRIPTION

Figure 1:
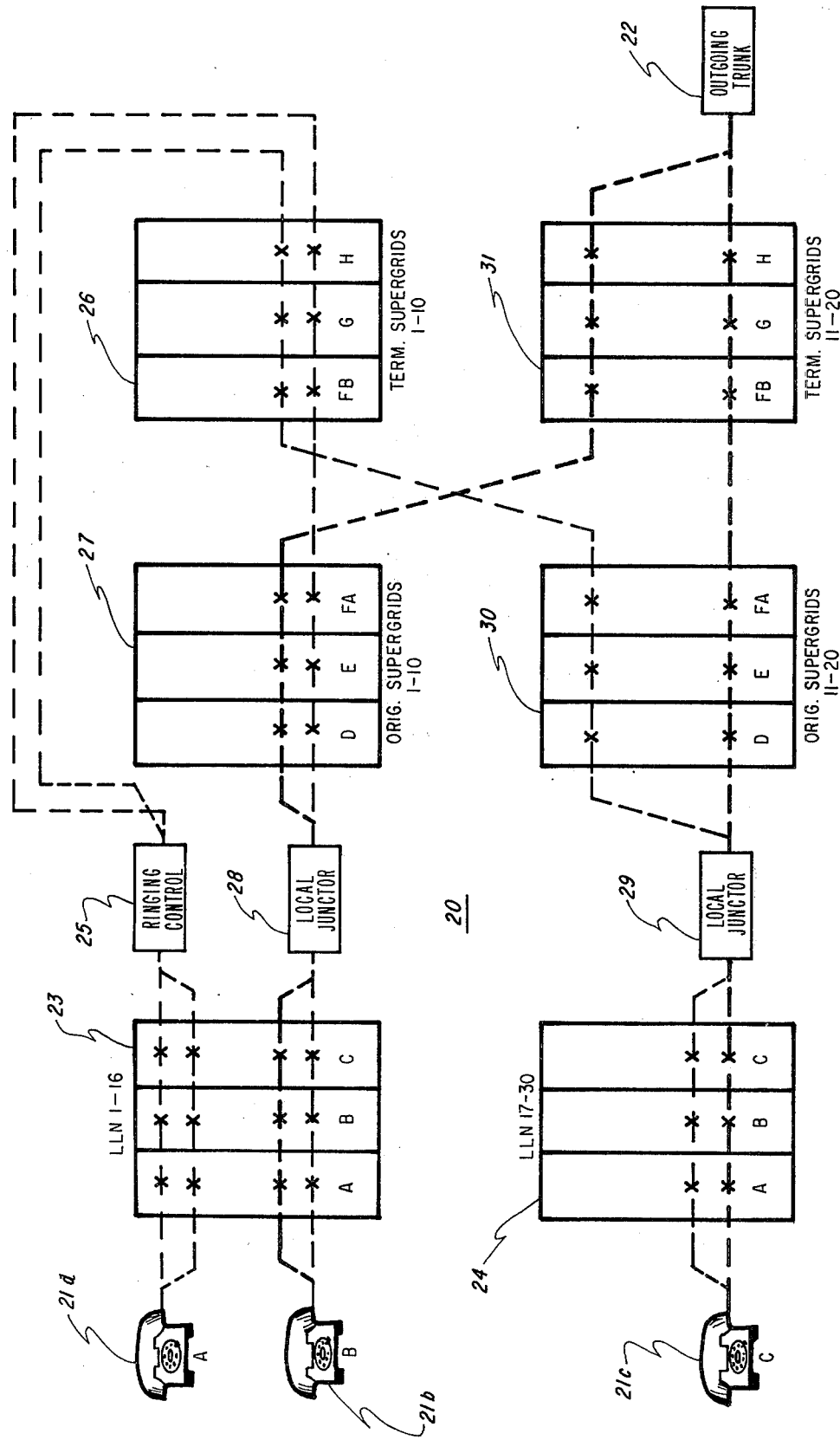
FIG. 1 is a schematic block diagram illustrating the circuit paths of telephone calls which may be terminated simultaneously in accordance with the principles of the instant invention.

FIG. 1—Schematic Description of Circuit Operation

Referring now to FIG. 1, there is schematically shown a central office switching system, designated generally by the numeral 20, which connects a plurality of telephones 21a–21c, or the like, selectively to one another or to outgoing trunks, illustrated the single outgoing trunk 22. The circuit 20 includes two separate line-link networks (LLNs) 23 and 24. For purposes of illustration, the telephones 21a and 21b are connected to LLN 23, while the telephone 21c is connected to the LLN 24. As will be set forth in detail hereinafter, two calls can be terminated simultaneously, provided one call is a local call and the second call is a trunk call, and further provided that the two calls have originated in separate groups of line circuits associated with separate LLNs 23 and 24.

For example, a first call may be set up connecting telephone 21a to telephone 21b. Generally, the call will follow a path through LLN 23, a ringing control 25, a terminating super grid 26, an originating super grid 27, and a local junctor 28. A second call may be set up connecting telephone 21c to outgoing trunk 22, through a path consisting of LLN 24, local junctor 29, originating super grid 30 and terminating super grid 31. In accordance with the principals of this invention, a call between telephones 21a and 21b and between telephone 21c and outgoing trunk 22 may be terminated simultaneously.

Exemplary of another pair of calls, which may be terminated simultaneously, is a call from telephone 21c to telephone 21a and a call from telephone 21b to outgoing trunk 22. The call from telephone 21c to telephone 21a originates in LLN 24, while the call from telephone 21b to outgoing trunk 22 originates in LLN 23. Again, since the calls originate in different LLNs, 23 and 24, and since telephone call 21c to 21a is local and the other telephone call 21b to outgoing trunk 22 is a trunk call, both of these calls may be terminated simultaneously.

As will be explained further hereinafter, the capacity of the central office switching circuit 20 may be increased 75 to 80% by terminating some calls simultaneously, instead of terminating calls singularly. As is readily seen, this results in a substantial savings in both equipment and design costs, since existing circuit designs may be readily and rather inexpensively modified to achieve simultaneous termination of two telephone calls.

Figure 2:
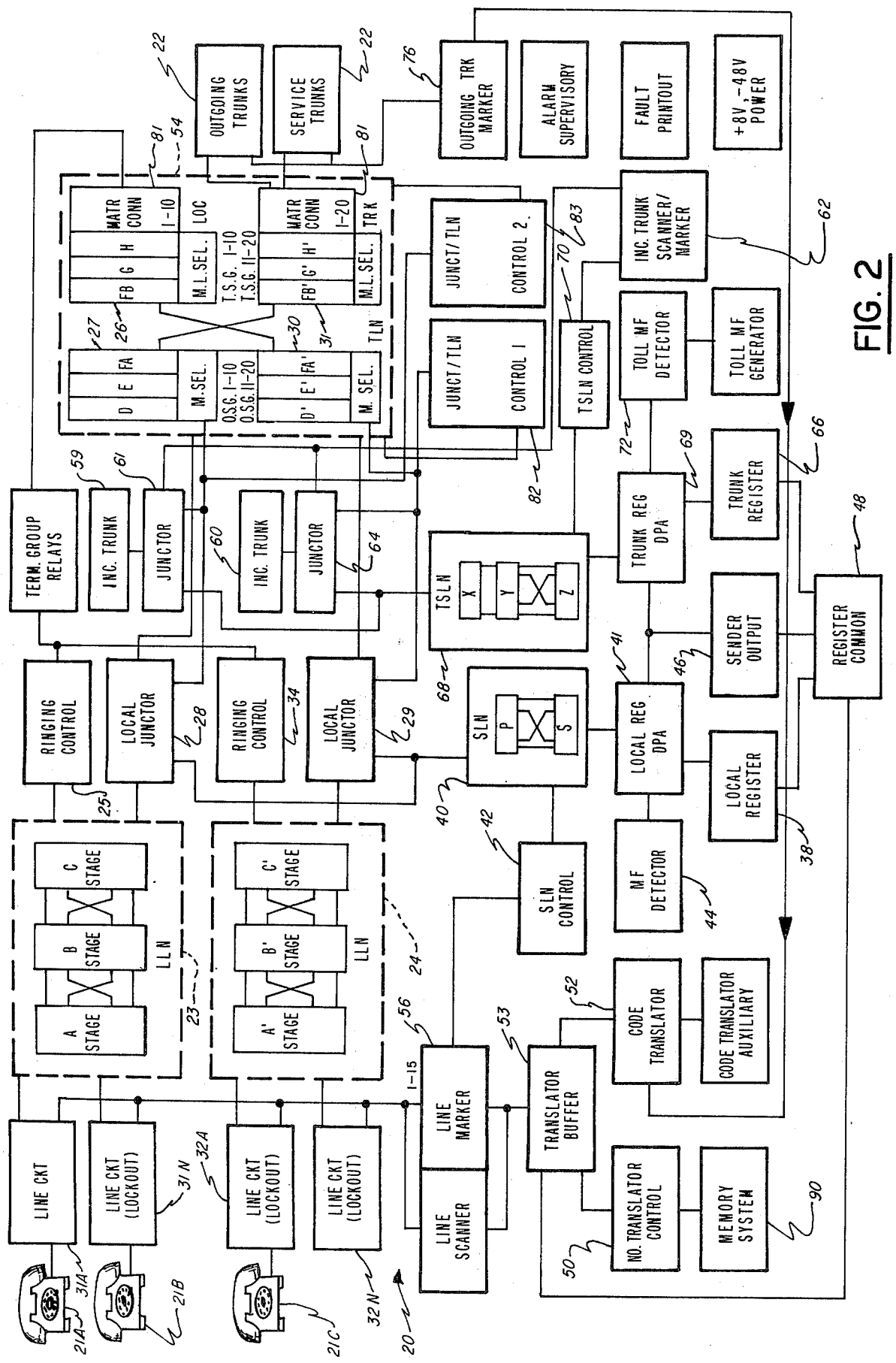
FIG. 2 is a schematic block diagram of an electronic telephone system within which is incorporated the features of the instant invention.

FIG. 2—General System Description

Referring now to FIG. 2, there is shown a block diagram generally illustrating a preferred embodiment of the central office switching circuit 20. The telephones 21a and 21b represent a first group of telephones connected to a first group of line circuits 31a–31n. The line circuits 31a–31n are, in turn, connected to the first LLN 23. The telephone 21c is representative of a second group of telephones connected to line circuits 32a–32n which are, in turn, connected to the second LLN 24. Consequently, there is a first group of telephones, represented schematically by the telephones 21a and 21b connected to a first LLN 23 and a second group of telephones represented schematically by the telephone 21c connected to a second LLN 24.

The telephones 21a, 21b and 21c are used for purposes of illustration only. It should be kept in mind that the telephones 21a–21c could be any type of suitable terminals, such as computers, teletype machines, or the like.

The LLNs 23 and 24 function as concentrators for originating line calls and as fan outs for terminating calls. Each LLN 23 and 24 consists of three stages of matrices A, B and C, and are used for both originating and terminating types of telephone traffic. The LLNs 23 and 24 are connected at one end to the plurality of line circuits 31a–31n and 32a–32n, respectively, with varying numbers, depending upon telephone service to be offered. The line circuits 31a–31n and 32a–32n are more fully described in U.S. Pat. No. 3,708,672 entitled Plug-IN Line Arrangement, filed June 15, 1971, in the name of Otto Altenburger and is assigned to the assignee of the present invention.

Each of LLNs 23 and 24 provides one unique path between circuits connected to opposite ends of the network. Each of the switching networks in FIG. 2 includes matrix switches comprised of relays, including a mark or control winding for initially actuating the relay and a hold or sleeve coil connected in series with its own contacts for maintaining the relay actuated after the path, through the network, has been established.

The C stages of the LLNs 23 and 24 provide termination for both originating traffic from the line circuits 31a–31n and 32a–32n and incoming traffic to the line circuits. The terminations for the LLNs 23 and 24 are connected to the local junctors 28 and 29 for originating traffic and to ringing controls 25 and 34 for terminating traffic. The number of local junctors and ringing controls provided depends upon the traffic requirement for the system. The ringing controls are more fully described in U.S. Pat. No. 3,671,678, filed Dec. 22, 1970, entitled R. C. Circuit, in the name of Otto Altenburger and assigned to the assignee of the present invention.

The local junctors 28 and 29 serve as focal points for all originating type traffic. The local junctors 28 and 29 include provisions for connecting the line circuits 31a-31n and 32a-32n to a local register 38 via a service link network (SLN) 40 and a local register dial pulse acceptor (DPA) 41. In addition, the local junctors 28 and 29 provide transmission battery for calling and called parties on intraoffice calls. The local junctors 28 and 29 are under the control of the calling party and, when trunk or station busy conditions are encountered, the local junctors provide the busy tone to the calling party.

Figure 3:
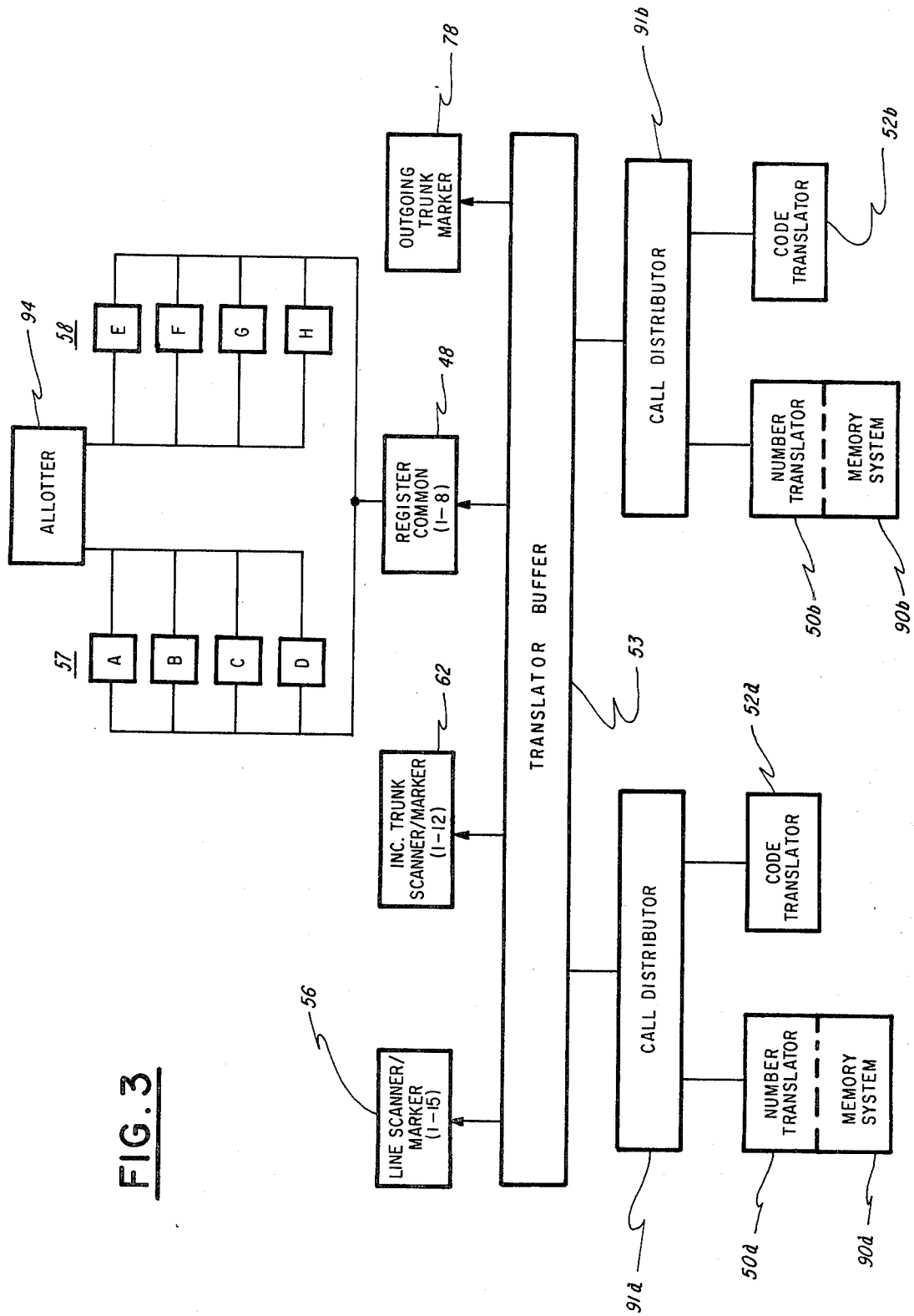
FIG. 3 is a schematic block diagram showing in more detail a portion of the system of FIG. 2 which relates specifically to the instant invention.

In order to connect one of the calling line circuits 31a-31n or 32a-32n to the local register 38 through one of the associated local junctors 28 and 29, the SLN 40 includes two stages of matrices (P and S) and is controlled by a SLN control circuit 42. As is shown in FIG. 3, and as will be explained hereinafter, the local register 38 includes four register groups A, B, C and D, each of which includes 60 separate subregisters. Accordingly, there are a total of 240 subregisters in the local register 38. Upon connecting the local register 38 (rather one of the 240 subregisters therein) to one of the local junctors 28 or 29, dial tone is provided. In addition, the local register 38 includes the apparatus for acting on the subscriber instructions. The local junctors 28 and 29 terminate on the P stage of SLN 40 and the DPA 41 terminates on the S stage of the SLN. The DPA 41 functions as an interface between the local junctors 28 and 29 and the local register 38. Furthermore, the DPA 41 provides dial tone to the calling subscriber, detects rotary dial pulses, and sends the pulses to storage sections in the local register 38. In the event of multifrequency signaling by the subscriber, the frequencies are detected by an MF detector 44 connected to the DPA 41.

In order to provide outpulsing, a sender 46 is provided. Both the local register 38 and the sender 46 are controlled by a register common 48. The local register 38 is connected to the register common 48 on a time division multiplex basis, wherein information is passed from one equipment to the other on a common bus. The register common 48 is also connected to a number translator 50 and a code translator 52 on a time division multiplex basis. The circuits of the number translator 50 and code translator 52 provide information, such as equipment number, ringing codes and class of service (COS). The number translator 50 and the code translator 52 are connected through a translator buffer 53 to a line scanner-marker circuit 56, which includes circuitry to detect service requests and circuitry to access the individual line circuits 31a-31n and 32a-32n.

The ringing controls 25 and 34 associated with the first and second LLNs 23 and 24 connect ringing generators to terminating or called stations, detect off hook conditions (ring-trip) of the called stations, and provide ring back tone for the calling station. Each of the line circuits 31a-31n and 32a-32n can be connected to any of a plurality of ringing controls, which have access from a trunk line network (TLN) 54, so that a ringing control is automatically connected to the terminating line circuits, as soon as the connections to that line is complete.

A circuit within the line scanner-marker circuit 56 continuously checks the line circuits 31a-31n and 32a-32n for an off hook condition. As previously stated, the line circuits 31a-31n and 32a-32n are more fully described in U.S. Pat. No. 3,708,672. The line scanner-marker circuit 56 is used for both the originating and terminating types of traffic. In the event of originating traffic, a line scanner in the circuit 56 stops when an off hook condition is detected and transmits the information from its counter circuits to a marker circuit in the circuit 56 to mark the particular line circuits 31a-31n or 32a-32n. This enables the SLN control 42, which then initiates a path finding operation between an available subregister within the local register 38 and the line circuit requesting service. In the event of terminating traffic, the line scanner is controlled by the number translator 50, wherein the line scanner-marker circuit 56 receives an equipment number from the number translator 50 to mark the line circuits 31a-31n or 32a-32n with the particular equipment location. Furthermore, in terminating traffic, the line marker portion of the circuit 56 is also involved in transmitting the terminating subscriber class of service, ringing codes, busy or idle status and types of ringing required through a pair of junctor controls 57 and 58 to the ringing control 25 and 34, respectively. The line scanner-marker circuit 56 is more fully described in U.S. Pat. No. 3,699,263 entitled Line Scanner and Marker Using Group Scanner, filed Dec. 23, 1970, in the names of gunter Neumeier and Otto Altenburger and assigned to the assignee of the present invention.

In operation, when a telephone 21a-21c goes off hook, the line scanner-marker circuit 56 detects the off hook condition and marks the line circuit connection to the A stage of whichever LLN 23 or 24 the telephone is connected to. Simultaneously, the line scanner-marker circuit 56 signals the SLN control 42 to begin its path finding process for connecting the marked line circuit to a subregister within the local register 38. The SLN control detects and locates the path in a three-step scanning process. The first scan locates the existence of a free path from a free subregister within the register 38 to the line circuit and identifies the free subregister and its corresponding stage S matrix module. The second scan identifies the free path through a P stage matrix module. The third scan identifies the free local junctor 28 or 29 depending on which LLN 23 or 24 is involved. The connection of the free local junctors 28 or 29 to the associated LLN 23 or 24 and the connection through the SLN 40 are now completed. When the path finding process is complete, the selected matrix relay coils in the LLN 23 or 24 and the SLN 40 are energized. The metallic connections through the tip and ring leads are checked. If the connection is complete, the sleeve coil connections are completed and the connected local junctor 28 or 29 is seized. At this time, the SLN control 42 releases the line scanner-marker circuit 56 and the local register 38 is connected to the subscriber to receive dial information. Once the subscriber information has been dialed into the local register 38, the call must be routed, either internally to another local subscriber or externally via an outgoing trunk 22 to another exchange.

Incoming calls from other exchanges are applied to one of a pair of incoming trunk circuits 59 or 60. An incoming trunk scanner-marker circuit 62 continuously scans the incoming trunks 59 and 60 looking for a seized incoming trunk circuit. When a seized incoming trunk circuit is located, a scanner circuit stops its scanning and transmits the trunk equipment number to a marker circuit, identifying the particular incoming trunk (both the scanner and marker circuits are identified by the numeral 62). The incoming trunk circuits 59 and 60 are each connected to trunk junctors 61 and 64, respectively, which are essentially identical to the local junctors 28 and 29, but which are connected between the incoming trunks 59 and 60 and the TLN 54 and a trunk service link network (TSLN) 68. The trunk junctors 61 and 64 function as focal points for all incoming type traffic and include provisions for connecting the incoming trunks 59 and 60 to any of a plurality of trunk registers 66 within a register group. As is shown in FIG. 3, two register supergroups 57 and 58 are provided and each consists of up to 240 registers (supergroup A, B, C, D, and E, F, G, H) each supergroup consists of four groups of up to 60 registers per group. A group of registers (up to 60) consists of local and trunk registers.

The junctors 61 and 64 are connected through the TSLN 68 and a trunk dial pulse analyzer (TDPA) 69 to the trunk register 66. The trunk junctors 61 and 64 also provide incoming and called parties with transmission battery and, when encountering either trunk or station busy conditions, return a busy tone to the incoming call. A trunk service line network (TSLN) control 70 functions to locate a path between the trunk junctors 61 and 64 and the trunk register 66. The trunk junctors 61 and 64 are terminated on the stage X matrix modules of the TSLN 68, while the trunk register 66 and TDPA 69 are terminated on the Z stage matrix modules. The TSLN 68 is divided into a number of separate grids. The incoming trunk scanner-marker circuit 62 signals the TSLN control 70 as to which of the grids will be used for accessing one of the subregisters within the register 66, as determined by the trunk junctor 61 or 64 involved in the connection. A multifrequency detector 72 is connected to the trunk register 66 through the TDPA 69.

The subregisters of the trunk register 66 are controlled by the register common 48, which communicates with the number translator 50 and code translator 52 on a time division basis. The code translator 52 is connected to an outgoing trunk marker circuit 76 in order to identify outgoing trunk groups 22. The outgoing trunk marker circuit 76 is more fully described in U.S. Pat. No. 3,732,377, issued May 8, 1973, entitled Outgoing Trunk Marker, filed in the names of Otto Altenburger and David Stoddard and assigned to the assignee of the instant invention. The sender circuit 46 provides outgoing pulsing for the subregisters of the trunk register 66 as well as for the subregisters of the local register 38.

Since the trunk junctors 61 and 64 are identified by the incoming trunk scanner-marker circuit 62, only a two-step scan is required in the path finding scheme of the TSLN control 70. In the first scan, a free path is detected between a free subregister within the trunk register 66 and the seized trunk junctor 61 or 64, thereby identifying a free trunk subregister. The connected Z stage matrix module is also thereby identified. The next scan locates a free path through the X and Y stage matrix modules to the marked trunk junctor 61 or 64 and energizes the mark relay coils through the Y and Z stage matrix modules and also energizes the mark relay coils through the Z stage matrix module to the marked trunk subregister. When the connection between the trunk junctor 61 and 64 and the trunk register 66 is completed, the metallic connections through the tip and ring leads are checked and then the sleeve connections are completed. The TSLN control 70 and the incoming trunk scanner-marker circuit 62 are now released. Once the incoming information has been received by one of the subregisters in the trunk register 66, the call is either routed internally to a local subscriber or externally to other exchanges via the outgoing trunk 22.

The TLN 54 provides for the termination of the local traffic to the local subscribers, the termination of incoming calls from other exchanges to the local subscribers, and for the connection of incoming calls from other exchanges to other external exchanges. The TLN 54 includes D and E stage matrices. However, as shown, additional matrices, such as FA, FB, G and H matrices, are included. Generally, the D stage provides the entrance to the TLN 54 and is connected to the local junctors 28 and 29 and the trunk junctors 61 and 64. In the illustrated embodiment, the TLN 54 is divided into two groups of matrices, which for purposes of convenience may be described as Super Group I matrices and Super Group I matrices. The Super Group I matrices in the TLN 54 and the Super Group II matrices are controlled by a junctor/TLN controls 82 and 83. The junctor/TLN controls 82 and 83 are required to complete the terminating portion of a telephone call, whether it is an internally terminated call or an outgoing call to a distant office. As will be further explained hereinafter, and is schematically shown in FIG. 3, the number translator 50 is divided into two independent sections 50a (regular) and 50b (standby). The code translator 52 is likewise divided into two independent sections 52a (regular) and 52b (standby).

The number translator 50 and the line scanner-marker circuit 56 are used to complete calls to local line circuits 31a–31n and 32a–32n. On the other hand, the code translator 52, together with the outgoing trunk marker circuit 76 completes calls to the trunks 22. The path finding scheme of the junctor/TLN control 82 includes a two-step scan. The local junctors 28 and 29 or the trunk junctors 61 and 64 have been previously marked (depending upon whether it is an incoming call or locally generated call). Furthermore, the information in the local register 38 or trunk register 66 is transmitted from these registers via the register common 48 to either the number translator 50 or the code translator 52, depending upon whether it is a call terminating to a local subscriber or a call going to a distant exchange, respectively. In the event of a call terminating to a local subscriber, the number translator 50 via the line scanner-marker circuit 56 marks the line circuit of the terminating call. In the event of an outgoing call, the code translator 52 via the outgoing trunk marker circuit 76 marks the particular outgoing trunk group 22. The first scans of the junctor/TLN controls 82 and 83 detect free paths through the TLN 54. These free paths go to either a marked outgoing trunk 22 or via the ringing circuits 25 and 34 and the LLNs 23 and 24 to a line circuit 31a–31n or 32a–32n. In addition, the E stage module is identified (the stage D module was identified by the seized local or trunk junctor). The next scan of the junctor/TLN controls 82 and 83 identifies and marks the input to the F stage modules. The subsequent scan also completes the connections back through the D and E stage modules to the marked junctor by energizing the matrix mark relay coils and also provides power through the F stage module and the associated LLN 23 or 24 to energize the mark relay coils. After a metallic path check is made via the tip and ring leads, the sleeve connections are picked up to complete the connection through the TLN 54.

The activated ringing control 25 or 34 now rings the called party on telephones 21a, 21b or 21c, respectively. The connections through the LLN 23 or 24 and the TLN 54 and through the local junctors 28 and 29 or trunk junctors 61 and 64 are maintained during the call under the control of the calling party. When the calling party hangs up, all the connections are broken. In the event the calling party still remains off hook after the called party hangs up, provisions are included in the junctor circuits 28, 29 or 61, 64 so that the connections are broken after a preset period of time.

In the illustrated embodiment, it is seen that the LLNs 23 and 24 establish separate LLN halves. It is also seen that the TLN 54 is divided into two groups of matrices known as Super Group I and Super Group II, which are identified by the letters D, E, FA, FB, G and H and D', E', FA', FB', G' and H', respectively. Accordingly, as seen in FIG. 2, there are separate groups of matrices in existence in the LLNs 23 and 24 and the TLN 54. Relating FIG. 2 to FIG. 1, it is seen that the matrices D, E, and FA of the TLN 54 are part of the original super grids 27 numbered 1-10, while the matrices FB, G and H form terminating super grids 26 numbered 1-10. In addition, it is seen that the matrices D', E', and FA' form original super grids 30 numbered 11-20, while matrices FB', G' and H' form terminating super grids 31 numbered 11-20. The terminating super grids FB, G and H are connected to ringing control 25, while the terminating super grids FB', G' and H' are connected to the outgoing trunk 22.

As will be further explained hereinafter, it is a duality of circuit structure, in which the circuitry is organized into Super Group I and Super Group II, which allows two calls to be terminated simultaneously, provided that one call is local and the second call is a trunk call, and further provided that one call is originated in line circuits 31a-31n and the other call in line circuits 32a-32n, or incoming trunks 59, 61 or 60, 64.

FIG. 3 —Number and Code Translator-Call Distributor Arrangement

Referring now to FIG. 3, and as explained before, it is seen that the number translator 50 and code translator 52 are divided into independent regular and standby segments 50a and 50b and 52a and 52b, respectively. The regular number translator 50a and code translator 52a are served by a call distributor section 91a, while the standby number translator 50b and code translator 52b are served by a call distributor section 91b. The call distributor sections 91a and 91b are connected to the translator transfer circuit 53 which is, in turn, connected to the line scanner-marker circuit 56, the incoming trunk scanner-marker circuit 62, the outgoing trunk marker circuit 78 and register common 48. Some of these connections are effected indirectly, such as the connection between the translator transfer 53 and the incoming trunk scanner-marker circuit 62 and outgoing trunk marker circuit 78. The register common 48 consists of eight register common circuits, four of which control four register groups within Super Group 57 and four of which control four register groups within Super Group 58. The four register groups within each Super Group each contain 60 subregisters. For purposes of convenience, the register groups in the Super Group 57 are designated by the letters A, B, C and D, while the register groups in the Super Group 58 and designated by the letters E, F, G and H.

The registers, themselves, are controlled by a register group allotter 94 which, in effect, serves as an alternator and which indexes down the register groups while switching back and forth between Super Groups in order to find a line termination with which to pair a trunk call termination, or vice versa.

In essence, the LLN circuits and the TLN circuits of the system 20 are divided in half, where in each half of the LLN circuits is associated with a separate super group of the TLN circuits and consists of half the total quantity of line units and their associated controls, and half the incoming trunks with their associated controls. In other words, line circuits 31a-31n and incoming trunk circuits 59 are associated with Super Group 57, while line circuit 32a-32n and incoming trunk circuit 60 are associated with Super Group 58. Each group of line circuits 31a-31n and 32a-32n has its own associated controls, i.e., every two line units (each consisting of 500, 750 or 1000 line circuits) have a line scanner-marker circuit 56 and SLN control 42. Up to 60 junctors 28 or 29 and up to 60 ringing controls 25 or 34 are provided per line unit. Up to 20 subregisters A, B, C, D, E, F, G or H are provided per line unit. The line scanner-marker circuit 56 and SLN control 42 should be considered as having two separate circuits, although these elements are shown as one block in FIG. 2. Each group of incoming truck circuits 59 and 60 has its own associated control, i.e., each group has its own incoming trunk scanner-marker circuit 62, TSLN control 70, and junctor/TLN control 82 or 83. As set forth before, this arrangement permits the termination of two calls simultaneously, with the stipulation that one call terminates to a local line and the second call to an outgoing trunk.

In practice, the elapsed time to terminate a local call or a trunk call is approximately 100 milliseconds, provided that their respective terminating request arrives in the number translator 50 and code translator 52 at the same time. The average time to search the memory 90 of the number translator 50 is approximately 4 milliseconds, which has little effect on the total terminating time of a local call.

A local call in one group (A, B, C, D, E, F, G or H) and a trunk call in the other group can be out of step by approximately 15 milliseconds or less depending on the density of the calls to be terminated. The calls are considered to be out of step when requests for termination are not received by the two supergroups at the same time. Each of the 240 subregisters of register groups A, B, C and D, comprising Super Group I, has a time slot assigned thereto and these time slots are synchronized with time slots of the 240 subregisters of Super Group II, i.e., register groups E, F, G and H. During peak traffic periods, the effective synchronization loss is lower than an average of 15 milliseconds. To perform a class of service check, which is normally requested after the type of call has been established, or on special cases upon seizure, the number translator 50 and call distributor 91 recognize this fact, and the time to complete this type of translation takes, on the average, 4 milliseconds. The output of the memory, which consists of the calling directory number and the class of service, is stored in a temporary storage, and is held there to be returned to the requesting subregister, when that subregister's time slot reappears in the call distributor 91. At the end of class of service translation, which is 4 milliseconds after seizure, the register group time slot is advanced to the next group, which then can perform a number translation.

In order to terminate two calls simultaneously, a minimum of four register groups must be provided. These would be register groups A and B of Super Group I and E and F of Super Group II. The remaining register groups can be added as required. Of the eight groups of registers A-H, when one group has access to the number translator 50, another group in the other super group has access to the code translator 52. The remaining six groups of registers are simultaneously scanned for class of service and termination request. The requests are classified as either local termination, trunk termination, or class of service request. Under ordinary traffic conditions, the requests will be serviced in the order in which they were received. Under high traffic conditions, the first request, which is recognized in the register group by either the number translator 50 or the code translator 52, will be the request which will be serviced. The high traffice-low traffic condition is automatically recognized by the call distributor 91 and is based on register occupancy.

The following table illustrates an example of line unit and trunk unit distribution, which the central office switching circuit 20 would service in a practical application:

| Super Group | Register Common | Line Units | Line Marker | Trunk Units | Incoming Trunk Marker | Register Quantity | Sender Quantity |
|---|---|---|---|---|---|---|---|
| 1 | A | 1, 2, 3, 4 | 1, 2 | 1 | 1 | 60 | 30 |
|   | B | 5, 6, 7, 8 | 3, 4 | 2 | 2 | 60 | 30 |
|   | C | 9, 10, 11, 12 | 5, 6 | 3 | 3 | 60 | 30 |
|   | D | 13, 14, 15, 16 | 7, 8 | 4 | 4 | 60 | 30 |
| 2 | E | 17, 18, 19, 20 | 9, 10 | 5 | 5 | 60 | 30 |
|   | F | 21, 22, 23, 24 | 11, 12 | 6 | 6 | 60 | 30 |
|   | G | 25, 26, 27, 28 | 13, 14 | 7 | 7 | 60 | 30 |
|   | H | 29, 30 | 15 | 8, 9 | 8, 9 | 60 | 30 |

LINE UNIT — INCOMING TRUNK (UNIT) DISTRIBUTION

Each line unit 31a-31n and 32a-32n serves 500, 750 or 1,000 lines. Each incoming trunk unit serves a maximum of 300 trunks. Generally, there are a total of 480 registers and, in one embodiment, 300 would be local registers and 180 would be incoming trunk registers. There are a total of 240 senders associated with the sender output 46.

The time slots are organized as follows. There is a register time slot of 512 milliseconds, which consists of 64 individual time slots of 8 milliseconds each. There is a register group time slot of 32.76 milliseconds, which is composed of 60 registers having 64 register time slots. Finally, there is a register super group time slot of 131.09 milliseconds, with 240 registers per group.

For purposes of illustration, relying on the disclosure thus far presented, the circuit 20 functions as follows. Assume for example, a local call is first ended and a trunk call originating in a separate line unit is subsequently ended. For example, referring to FIG. 1, a local call may be placed through LLN 23 from telephone 21a to 21b, while a trunk call may be placed from telephone 21c through LLN 24 to outgoing trunk 22. For purposes of illustration, the local call is connected to register group A (FIG. 3) — in particular local register 38 of Super Group I. The number translator memory 90 associated with number translator 50a is seized first and a switch through signal is then sent to register 38. Almost simultaneously with sending the switching signal, the junctor 57 and associated junctor/TLN control 82 are seized. After 4 milliseconds, the line scanner-marker circuit 56 is seized, the called line is marked and number translator memory 90 is released, while the seizure of the junctor 57 and junctor/TLN control 82 is continued. Just prior to the expiration of 8 milliseconds, the seizure of a junctor 28 or 29 and junctor/TLN control 82 is completed and, at about 8 milliseconds, the path finding operation is commenced.

Keeping in mind that the circuit 20 is continuously connecting and terminating calls, assume that a trunk call to be terminated is connected in register group E in the trunk register 66 and, therefore, is within Super Group II. Assuming the most undesirable condition, the trunk call seizes the code translator 52a 15 milliseconds after the number translator 50a was seized. Almost immediately, a switch through signal is sent to the incoming trunk register 66, and the junctor 58 and associated junctor/TLN control 83 is seized. The outgoing trunk marker circuit 76 is then seized. After seizure of the outgoing trunk marker circuit 76, the path finding operation of the local call has already been completed, and subsequently, 23 milliseconds after the number translator 50a was initially seized for the local call, seizure of a junctor 61 or 64 and junctor/TLN control 83 is completed. The trunk path finding operation is then commenced.

After the expiration of 80 milliseconds, the number translator 50a is released and is ready for a new local call. Just prior to the expiration of a 100 millisecond time interval, and after the seizure of the code translator 52a, the path finding operation of the trunk call is completed. 100 Milliseconds after seizure of the code translator 52a and 115 milliseconds after the seizure of the number translator 50a, which initiated this operation, the code translator 52a is released and ready for a new call. Finally, the register group A in Super Group I is transferred for termination of a trunk call and the register group E in Super Group II is transferred for termination of a local call.

Figure 4:
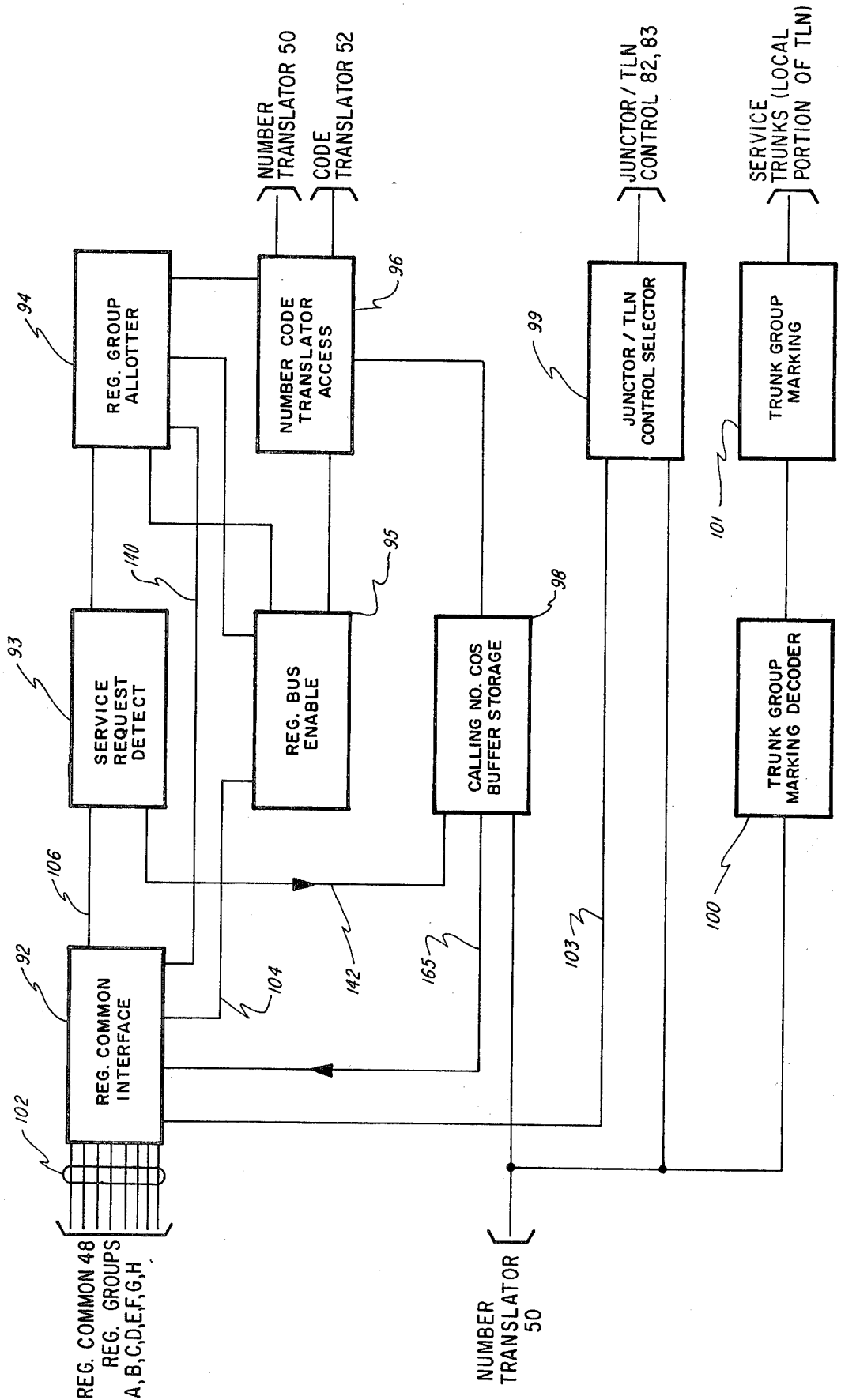
FIG. 4 is a schematic block diagram illustrating the circuitry of a call distributor circuit used in accordance with the principles of the instant invention.

FIG. 4—Call Distributor Block Diagram

FIG. 4 is a block diagram of the circuitry for call distributor circuit 91a or 91b (which are identical). FIG. 4 ties together the circuitry shown in FIGS. 5-12, which more specifically set forth how the call distributor operates to terminate two calls simultaneously. The call distributor circuit basically includes a register common interface 92, which provides interface connection between all of the register groups A-H and the call distributor circuit 91a or 91b, respectively.

A service request detect circuit 93 detects the class of service request of the register groups A-H and also controls the register group advance signal, which occurs when the number translator 50a or 50b releases. In addition, the service request detect circuit 93 contains a register supergroup allotter, which detects which group of the Super Group I and II will be enabled for local or trunk calls. When both the number translator 50a or 50b and code translator 52a or 52b are idle, a flip-flop within the service request detect circuit 93 serves as a key device which is set or reset.

A register group allotter 94 is included in the call distributor and consists of two counters which control buses to the register Super Groups I and II. Each counter counts up to four, which is the quantity of register groups shown within each super group. In other words, one counter will control register groups A, B, C, and D in Super Group I, whereas the other counter will control register groups E, F, G and H which are in Super Group II. Each time a call in one of the groups A-D or E-H is completed, a release signal advances the counter to the next group.

A register bus enable circuit 95 provides gating to logically combine all data buses to enable one of the groups of registers A-H to send data to the number translator 50a or 50b or the code translator 52a or 52b.

A number and code translator access circuit 96 provides gating for sending and receiving signals from a number translator 50a or 50b and a code translator 52a or 52b. In addition, the translator access circuit 96 forwards information from the number and code translators to either the register Super Group I, i.e., A, B, C and E, or to register Super Group II, i.e., E, F, G and H. A calling number class of service buffer storage circuit 98 provides storage of the calling directory number and calling class of service for each of the register super groups. This is a temporary storage for class of service translation, which is required to lower the average occupancy of the number translator 50a or 50b.

A junctor/TLN control selector 99 provides an interface between the operating call distributor circuit 91a or 91b and the junctor/TLN control 82 or 83. This circuit controls signal leads during termination of local calls.

A trunk group marking decoder 100 decodes signals from the number translator 50a or 50b, while a trunk group marker 101 provides final marking of trunk groups which connect through the trunk portion 81 of the TLN 54.

The register common interface 92 has individual inputs along lines 102 from each of the register common groups A, B, C, D, E, F, G and H. The function of the register common interface is to distribute register common information to the junctor/TLN control selector 99, over line 103, to the register bus enable 95, over line 104, and to the service request detect circuit 93, over line 106. The register common interface 92 also serves as a signal converter and steps down incoming voltage from minus 48 volts to 5 volts. In essence, the register common interface 92 is a conventional driver circuit, such as a three transistor type driver circuit.

The outputs of the register common interface 92 are impressed over lines 103, 104 and 106 on a binary basis, according to a sequence of time slots. According to a preferred embodiment, there will be a register time slot of 512 microseconds, register group time slots of 30 milliseconds, and a super group time slot of 420 milliseconds.

The information coming in on lines 102 from the register common 48 and the register groups A-H, which is of primary interest here, are class of service requests and translation requests. A translation request is a request to terminate a call. It should be kept in mind that information also goes out from the register common interface 92 back to the register groups A-H.

The service request detect circuit 93 receives information from the line 106, from the register common interface 92 and detects, whether during the appropriate time slot, there is a class of service request, and determines whether or not class of service information can be provided. The service request detect circuit 93 will only store a class of service request if the number translator 50 is idle. The information received by the service request detect circuit 93 at any point in time is from one register within the group of 60 registers comprising one of the register groups A-H.

Figure 5:
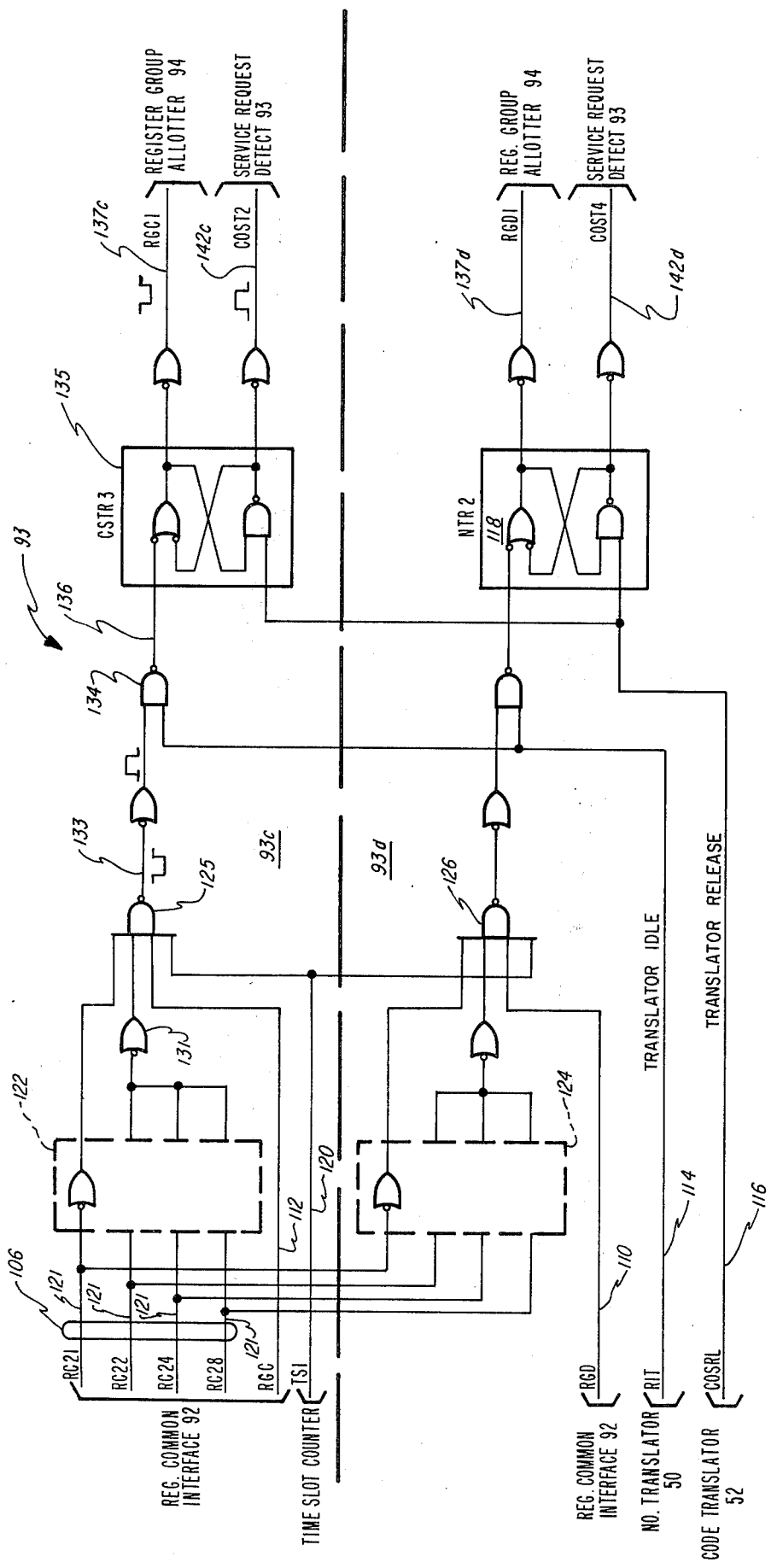
FIG. 5 is a schematic circuit diagram of a portion of a service request detect circuit of the call distributor illustrated in FIG. 4.

FIG. 5—Service Request Detect Circuit 93 (First Portion)

Referring now to FIG. 5, there is shown a pair of circuits which is one of four identical pairs of circuits comprising the service request detect circuit 93. Since there are four pairs of circuits, there are eight separate circuits. These circuits are substantially identical and each circuit is associated with one group of the register groups A, B, C, D, E, F, G and H.

It is seen that the service request detect circuit 93 illustrated has inputs from register groups C and D along lines 112 and 110, respectively. As is seen in FIG. 5, the circuit 93 is divided into two similar circuits 93C and 93D, wherein 93C serves register group C while 93D serves register group D.

Along line 114, a signal is sent from the number translator 50, which is high when the number translator is idle, and therefore, informs the circuit 93 that the register requesting a class of service will get class of service information. When no signal is impressed over line 114, the number translator 50 is not idle and the circuit 93 will not provide class of service information. After the class of service information is provided, a translator release line 116 will be pulsed to reset a flip-flop circuit 118 so that the service request detect circuit 93 will be ready to receive a subsequent class of service request. The class of service release operates on circuit portions 93C as well as circuit 93D.

Both the circuits 93C and 93D are operable only during a time slot determined by pulsing of a time slot line 120. Only when the time slot is impressed over line 120 will the circuits 93C and 93D detect and receive information from the register groups C and D over lines 112 and 110, respectively.

Binary information is transmitted from the register common interface 92 via line 106, which includes four lines 121. The purpose of this binary information is to ultimately enable AND gate 125 or AND gate 126. In other words, during the time slot impressed over line 120, lines 121 will receive 1,0,0,0 over the four lines. The 1,0,0,0 input will be impressed on gates 122 in circuit 93C and gates 124 in circuit 93D. When a one is present on line 106, then the output of gate 122 is high or rather one. When the signal impressed over the line 106 is 1,0,0,0, then in order to have a high output into the AND gate 125, OR gate 131 inverts the 000 portion of the signal to have a high output. Therefore, the lines inputting into AND gate 125 are all high since the inputs on line 120 and 112 are direct and the outputs of AND gates 122 and OR gates 131 are high. In this regard, it should be kept in mind that the input over line 112 from the register group C is just a group enable signal.

When AND gate 125 is enabled, it acts as an inverter and a low output is impressed over line 133, which is then inverted again to produce a high signal feed into an AND gate 134. Also fed into the AND gate 134 is the signal from line 114, which indicates whether or not the translator is idle. If the translator is idle, then the AND gate 134 is enabled. This produces a low output on line 136, which leads to a set of flip-flops 135. The output of the flip-flop set 135 is high and is then inverted to produce a low signal on line 137c, which is transmitted to the register group allotter circuit 94. The register group allotter circuit 94 then sends a signal back to the register common interface 92 via a line 140 (see FIG. 4). The signal on line 140 (FIG. 4) tells a subregister in the register group C that the request has been accepted, and the call will be served. If the output on line 137c is positive, then essentially nothing happens and the request is continuously repeated until a low signal is impressed over line 137c, indicating that the request is accepted.

When there is a low signal impressed on line 137c to the register group allotter 94, the flip-flop 135 impresses a high signal on a line 142. Suitable gating is disposed between flip-flops 135 and the lines 137c and 142c to ensure that, when there is a low signal on line 137c, there will be a high signal on line 142. The same considerations apply to lines 137d and 142d for register group D. It should further be kept in mind that there are identical service request detect circuits for each of the other register groups A, B, E, F, G and H. These service request detect circuits are also arranged in pairs so that register groups A and B form a pair, register groups E and F form a pair, and register groups G and H form a pair.

Figure 6:
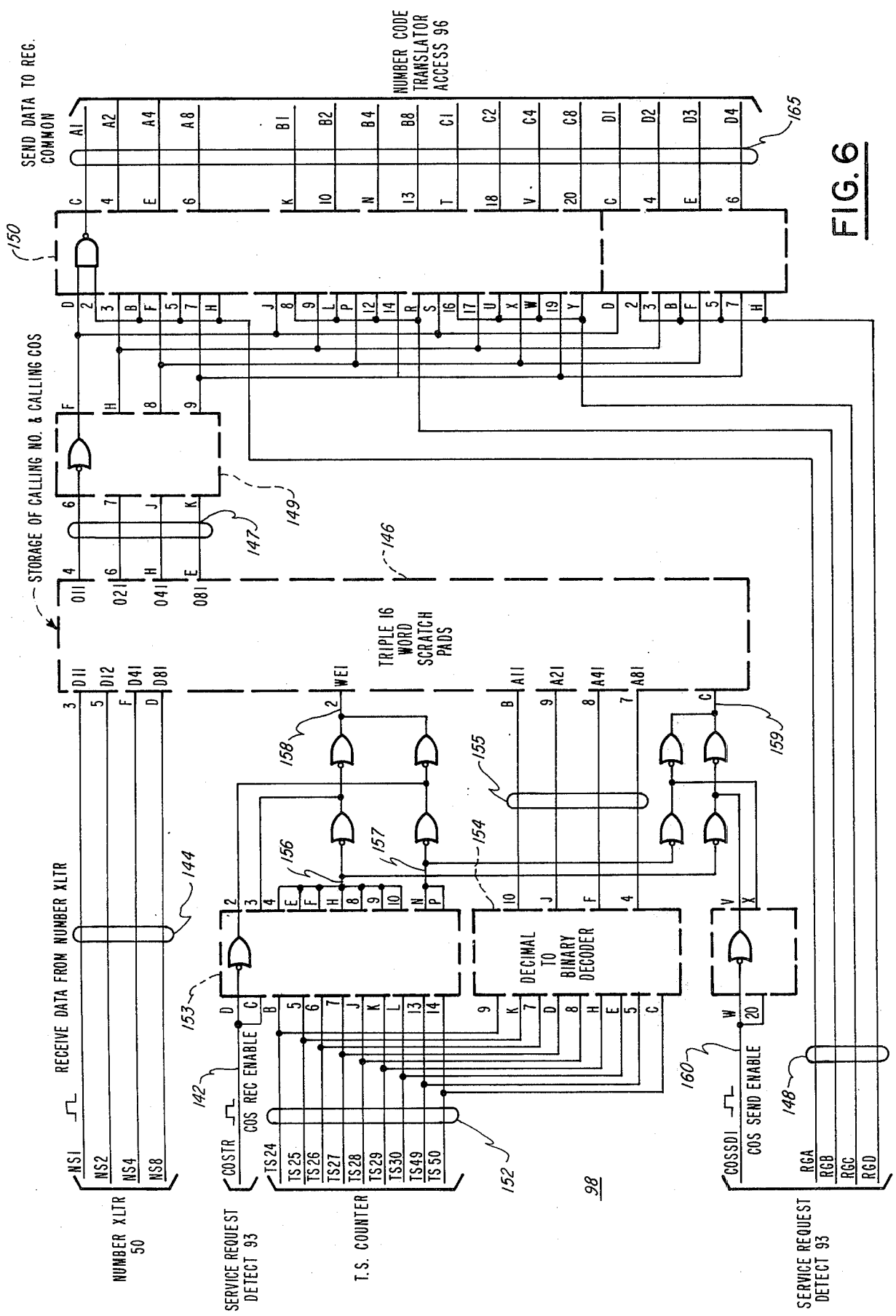
FIG. 6 is a schmatic circuit diagram of a calling number-class of service buffer storage circuit used in the call distributor of FIG. 4.

FIG. 6 Calling Number-Class of Service Buffer Storage

Referring now to FIG. 6, which is a more detailed showing of the calling number-class of service buffer storage 98, there is shown one half of the buffer storage circuit 98. The particular half shown is associated with the Super Group I and, therefore, with register groups A, B, C and D. The other half of the buffer storage circuit 98 is associated with register groups E, F, G and H of Super Group II. Since the second half is identical with the first half, it is not illustrated. The high signal on line 142 from the service request detect circuit 93 is forwarded to store the class of service request in the buffer storage 98. Also feeding into the buffer storage 98 is an output 144 from the number translator 50, which stores the calling number and the class of service in a scratch pad memory 146. After this information is stored, information is sent back to the register. There is a time lag which allows the number translator 50 to look into its memory and forward the calling number over line 144 to the scratch pad memory 146. The scratch pad memory 146 is not in synchronism with the system, but recognizes the first register group A, B, C or D which appears with the proper time slot, as determined by a pulse on one of the lines 148 from the service request detect circuit 93.

The scratch pad memory 146 reads out over lines 147 via a plurality of inverters 149 and is effectively inhibited, or not, as the case may be, by a register group time slot and an outpulse on all but one of the lines 148 from the service request detect circuit 93.

There are sets of AND gates 150 connected to the inverter 149, wherein one set of AND gates is associated with each register group A, B, C and D. Only one set of AND gates 150 is not inhibited and operates to pass information to its associated register group.

The time slots are applied to the buffer storage 98, over lines 152. The time slots identified by TS 24 through TS 30 are seven in number and represent the calling number, while the last two time slots, identified by TS 49 and TS 50, relate to the class of service. The signals on line 152 are transmitted to a plurality of inverters 153 and to a decimal-to-binary decoder 154. The decimal-to-binary decoder 154 inputs to the scratch pad memory 146 over lines 155. The scratch pad memory 146 is designed to work with binary numbers rather than decimal numbers, and the decoder 154 simply identifies which one of the nine lines TS 24 through TS 50 has a high signal impressed thereon. The output from the inverters 153 serving time slots TS 24 through TS 30 and representing the calling number are combined to output over a line 156. The output on the line 156 is high when there is no signal present on the time slot inputs TS 24 through TS 30. When there is an input on one of the lines TS 24 through TS 30, there is a low signal on line 156. The same is true for the time slots TS 49 and TS 50, which are class of service time slots. When there is a signal on either TS 49 or TS 50, there will be a low output on line 157. The signals on lines 156 and 157 are then gated through inverters and applied to the scratch pad memory 146 over a line 158, instructing the scratch pad memory 146 to write in, with respect to a particular time slot. It should be kept in mind that the time slots relate to each register within a group of registers. In other words, each of the 60 registers within each group of registers is served by a particular number of time slots. The write-in signal on line 158, in essence, instructs the scratch pad memory 146 to write in data received from the number translator 50 along lines 144.

The outputs from the inverters 153 applied to lines 156 and 157 are then applied over line 159, which causes the scratch pad memory 146 to read out or to write out, upon receiving an enabling signal from the service request detect circuit 93. The signal on line 160 is conveniently referred to as a class of service send enable signal. In operation, when there is a high on line 160, the scratch pad memory 146 reads out the class of service and the calling number stored in the scratch pad memory. There is no high on line 160, until the number translator has performed its job to store the calling number in the scratch pad memory 146 and is idle. The information from the scratch pad memory 146, i.e., the calling number and class of service, are pulsed out over lines 147 through inverters 149, the output of which is passed through circuits 150 and out over lines 165 to the register common interface 92 and the registers in Super Group I.

Keeping in mind that the half of the buffer storage circuit 98 shown in FIG. 6 serves Super Group I and therefore register groups A, B, C and D and that the other half of the buffer storage circuit 98, is connected to Super Group II, and the inputs over the equivalent to line 148 come from register groups E, F, G and H.

Figure 7:
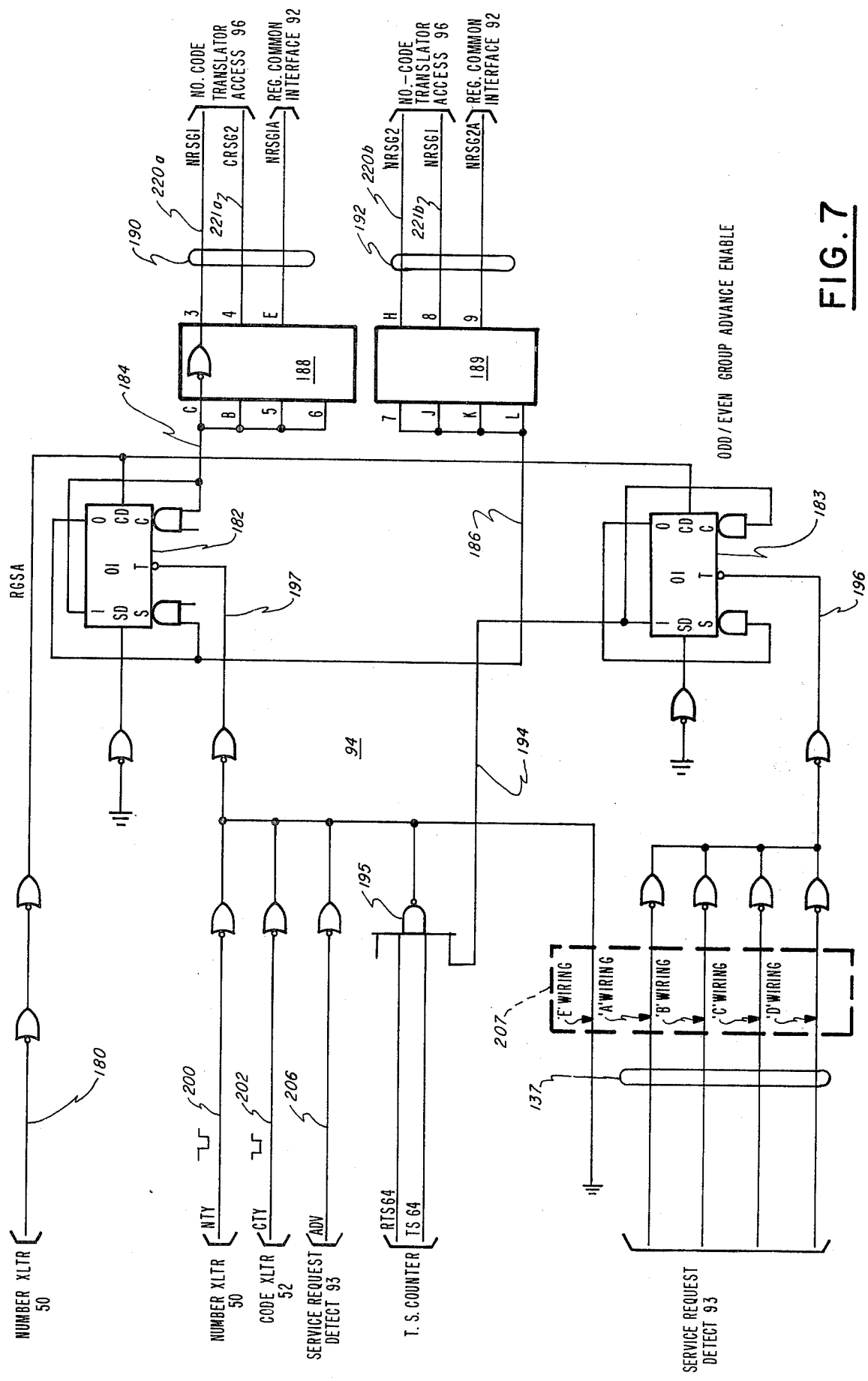
FIG. 7 is a schematic circuit diagram of a first portion of a register group allotter circuit used in the call distributor of FIG. 4.
Figure 8:
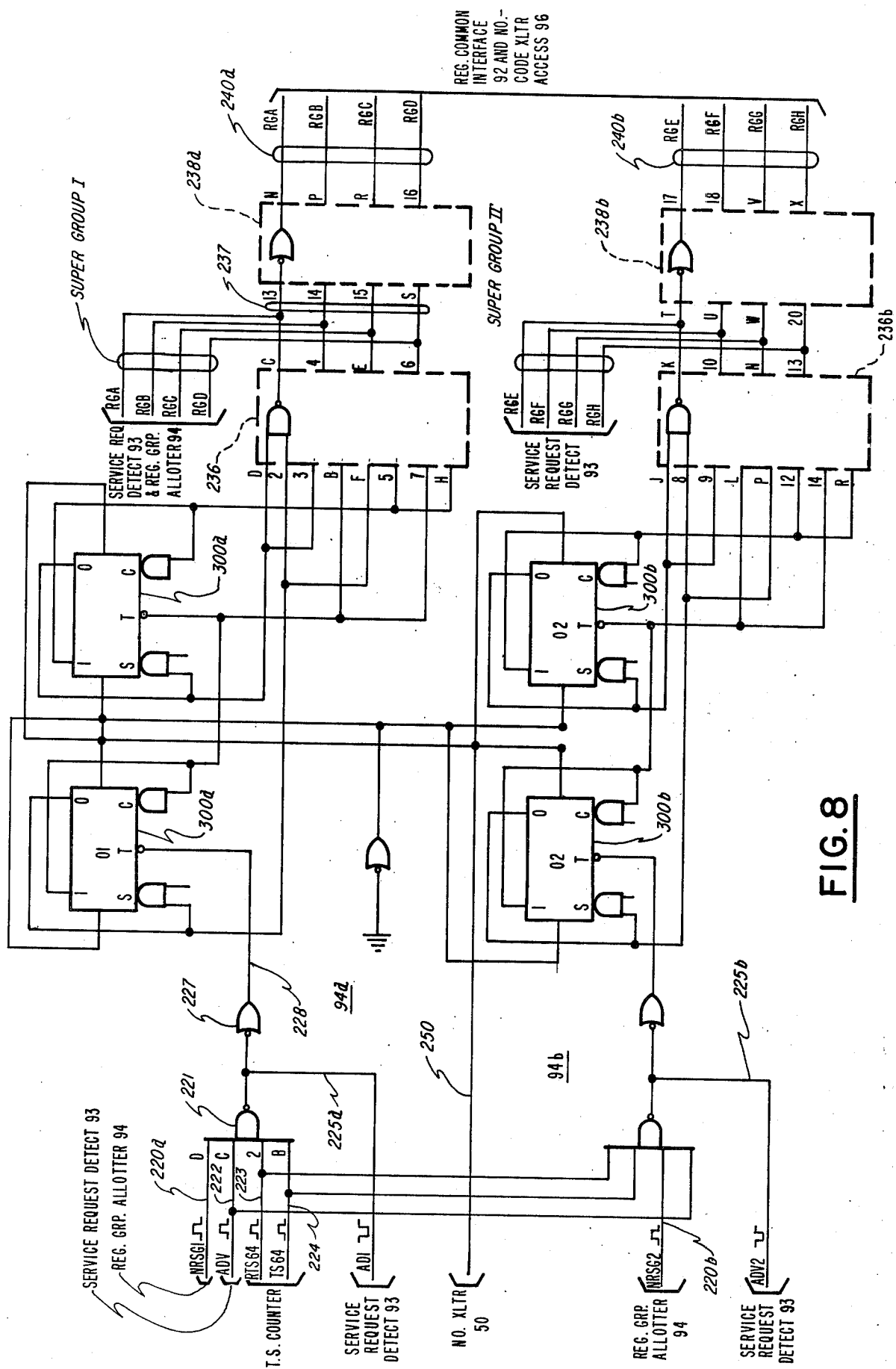
FIG. 8 is a schematic circuit diagram of a second portion of the register group allotter circuit used in the call distributor of FIG. 4.

FIGS. 7 and 8 — Register Group Allotter 94

Referring now to FIGS. 7 and 8, the circuitry of the register group allotter 94 is shown. After the number translator 50 has serviced the request for service, it sends a release signal or reset signal over the line 180 to the register group allotter 94. The signal on line 180 is applied to reset flip-flops 182 and 183. The flip-flop 182 has outputs over lines 184 and 186, respectively. The output over line 184 permits the number translator 50 to service register Super Group I and the code translator 52 to service register Super Group II. In other words, when a low signal is present on line 184, a local call in Super Group II is being serviced and a trunk call in Super Group II is being serviced.

When a low signal is present on line 186, the number translator 50 is permitted to serve a local call in Super Group II and the code translator 52 is permitted to serve a trunk call in Super Group I.

As the flip-flop 182 switches back and forth lines 184 and 186 are alternately pulsed, the register group allotter 94 assigns the correct register to the number translator-code translator access circuit 96, as will be explained hereinafter.

The signals from the lines 184 and 186 are passed through associated inverters 188 and 189, respectively, before being impressed on lines 190 and 192. The outputs on lines 190 are all high or all low, while the outputs on lines 192 are either all low or all high in opposite phase to the outputs on lines 190.

The flip-flop 183 is known as an odd/even group advance enable and makes sure that the flip-flop 182 resets after the expiration of the appropriate time slot, instead of in the middle of the time slot. The flip-flop 183 pulses line 194 and enables an AND gate 195, which receives time slot pulses from the time slot counter. During the 64th register time slot (last register in a group being scanned) and during the last time slot within the last register, AND gate 195 resets the flip-flops 182 and 183 over toggle leads 196 and 197.

When there is an idle condition in the number translator 50 the flip-flop 182 will be reset. An idle condition is indicated by a low on line 200. It is also necessary to have a low on line 202, from the code translator 52 and a low in on line 206, indicating that no register is being serviced by the number translator 50. Everything must be idle, before the flip-flop 182 is reset and this is indicated by a signal impressed in over line 197 to the flip-flop 182.

The strapping arrangement 207 has inputs from each of the register groups A–H and provides that as long as one of the groups is being serviced, there will be a toggle signal over line 196 to the flip-flop 183.

Referring now to FIG. 8, there is shown a further portion of the register group allotter circuit 94. The purpose of the circuitry in FIG. 8 is to decide what group to enable, out of the group of register groups A–H, as the flip-flops 182 and 183 (FIG. 7) are advanced. If there is release signal present then there is an advance, during the register time slot 64. One output of the lines 190 of FIG. 7 is line 220a, which is associated with the number translator 50 and the local register groups of Super Group I. The line 220a is connected to an AND gate 221, along with an advance signal line 222, a register time slot line 223 and a system time slot line 224. The lines 223 and 224 are high during register time slot 64 and system time slot 64. In addition, there is an advance signal impressed over line 225 from the service request detect circuit 93, after the number or code translator release in Super Group I. If there is a low on line 225, the gate 227 is ready to receive a counting pulse from the gate 221, so as to advance a counter 300a, which is simply composed of a pair of flip-flop which count up to 4. Each time the gate 227 pulses a line 228, the flip-flops in counter 300a advance one count. Each count relates to one register group in Super Group I. The counter output is impressed over lines 235 through a binary to decimal converter 236, having an output over lines 237, each of which is associated with one of the register groups A, B, C and D in Super Group I. The signals on line 237 are then passed through an inverter 238 and are sent out on lines 240a to the number translator-code translator access 96 and the register common interface 92. Counter 300b operates in an identical manner for Super Group II to produce an output on lines 240b.

A line 250 transmits a signal from the number translator 50 which is similar to the signal 180, in FIG. 7. This signal indicates to the counter 300 that the number translator 50 has been reset.

The circuit of FIG. 8 has two identical halves 94a and 94b. The half above the line 250, i.e., 94a is for Super Group I, while the half below line 250, i.e., 94b is for Super Group II. The two halves of the circuits function identically. However, the lower half of the circuit is associated with register groups E, F, G and H instead of register groups A, B, C and D.

Figure 9D:
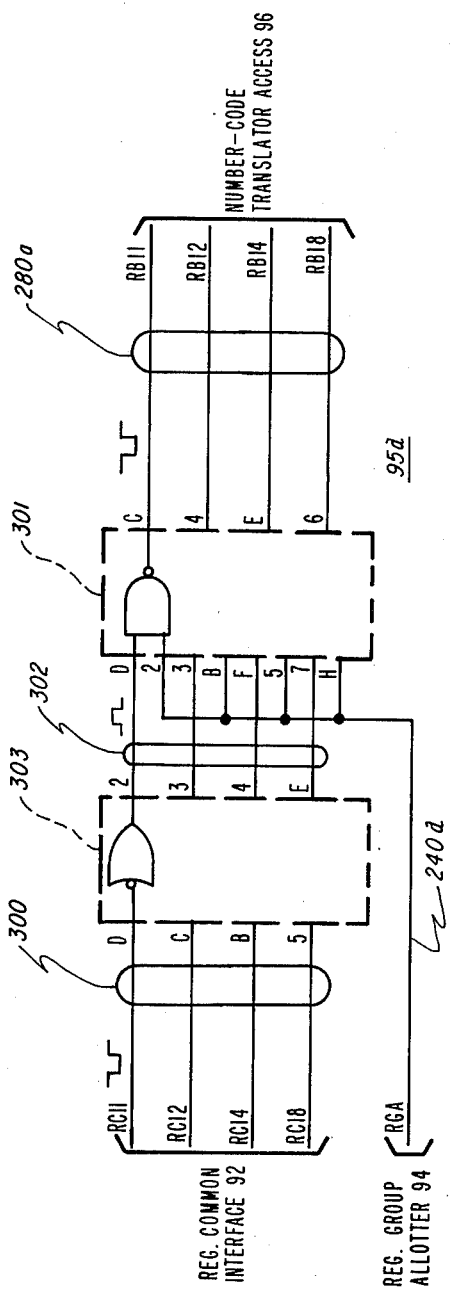
FIGS. 9a and 9b are schematic circuit diagrams of portions of a register bus enable circuit used in the call distributor of FIg. 4.
Figure 9B:
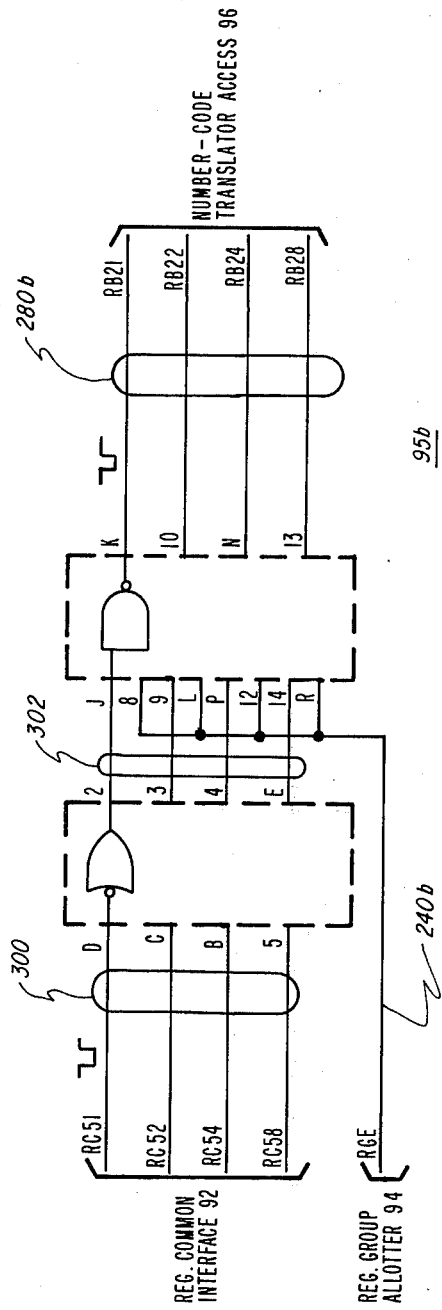

FIGS. 9A and 9B —Register Bus Enable Circuit 95

Referring now to FIGS. 9a and 9b, the logic circuitry of the register bus enable circuit 95 is shown. Again for purposes of illustration the circuit is shown as two segments 95a and 95b wherein 95a is associated with Super Group I and 95b is associated with Super Group II. There are four logic circuits such as 95a which provide outputs to lines 280a and four logic circuits such as 95b which provide outputs to lines 280b. For purposes of convenience only one of each group of circuits is shown. Each circuit corresponds to a single register group and as illustrated, 95a is associated with register group A in Super Group I, while 95b is associated with register group E in Super Group II.

The circuits 95 have inputs over lines 300 from the register common interface 92 and inputs over lines 240 from the register common group allotter 94. The inputs on lines 240 from the register group allotter 94 are enable signals applied to a plurality of AND gates 301 to transmit high signals on lines 302 from inverters 303, which simply invert the low signals in on lines 300. If the AND gates 301 have an output, the output will be a low signal on lines 280a.

Figure 10:
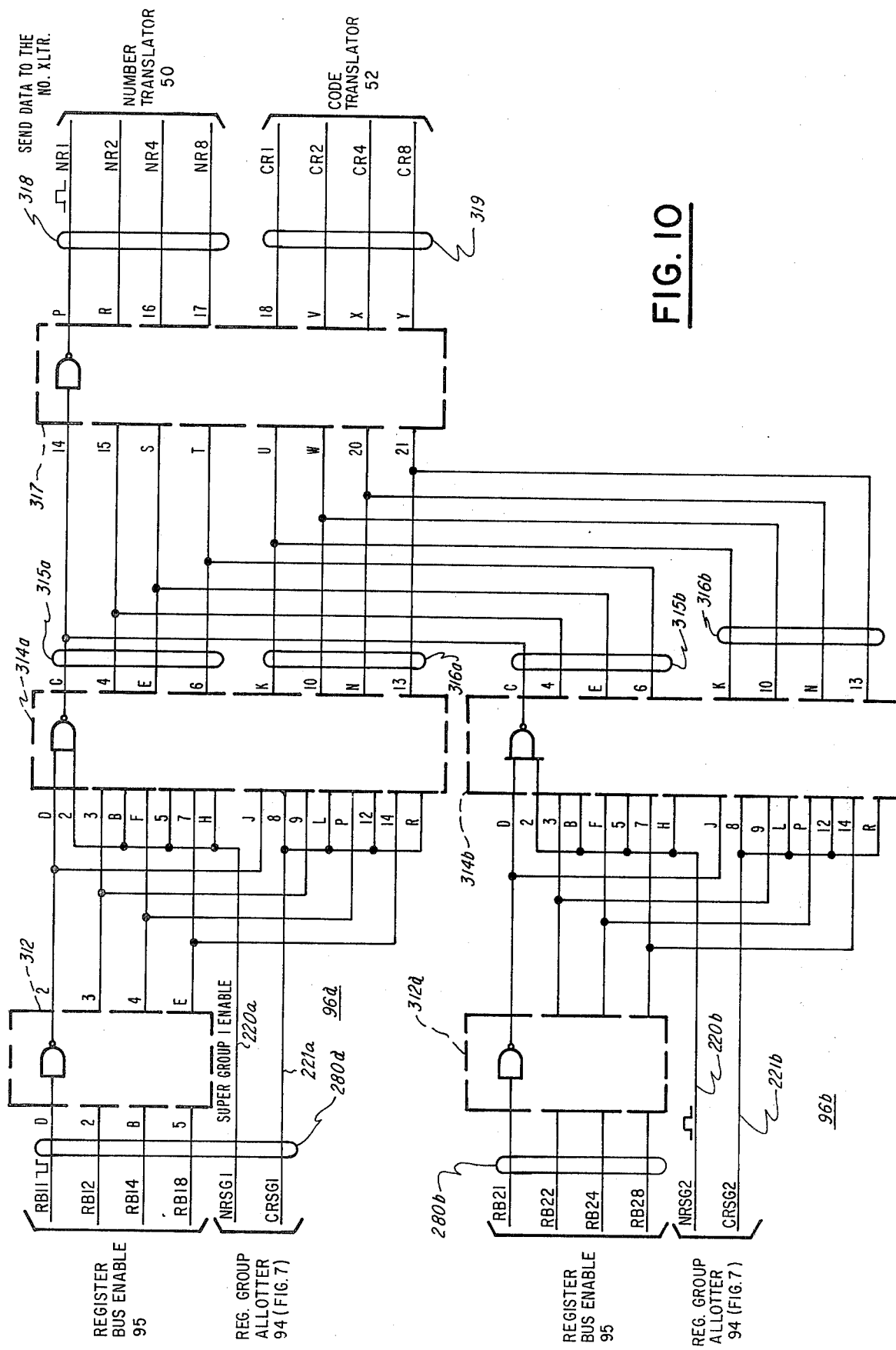
FIG. 10 is a schematic circuit diagram of a first portion of a number translator-code translator access circuit used in the call distributor of FIG. 4.
Figure 11:
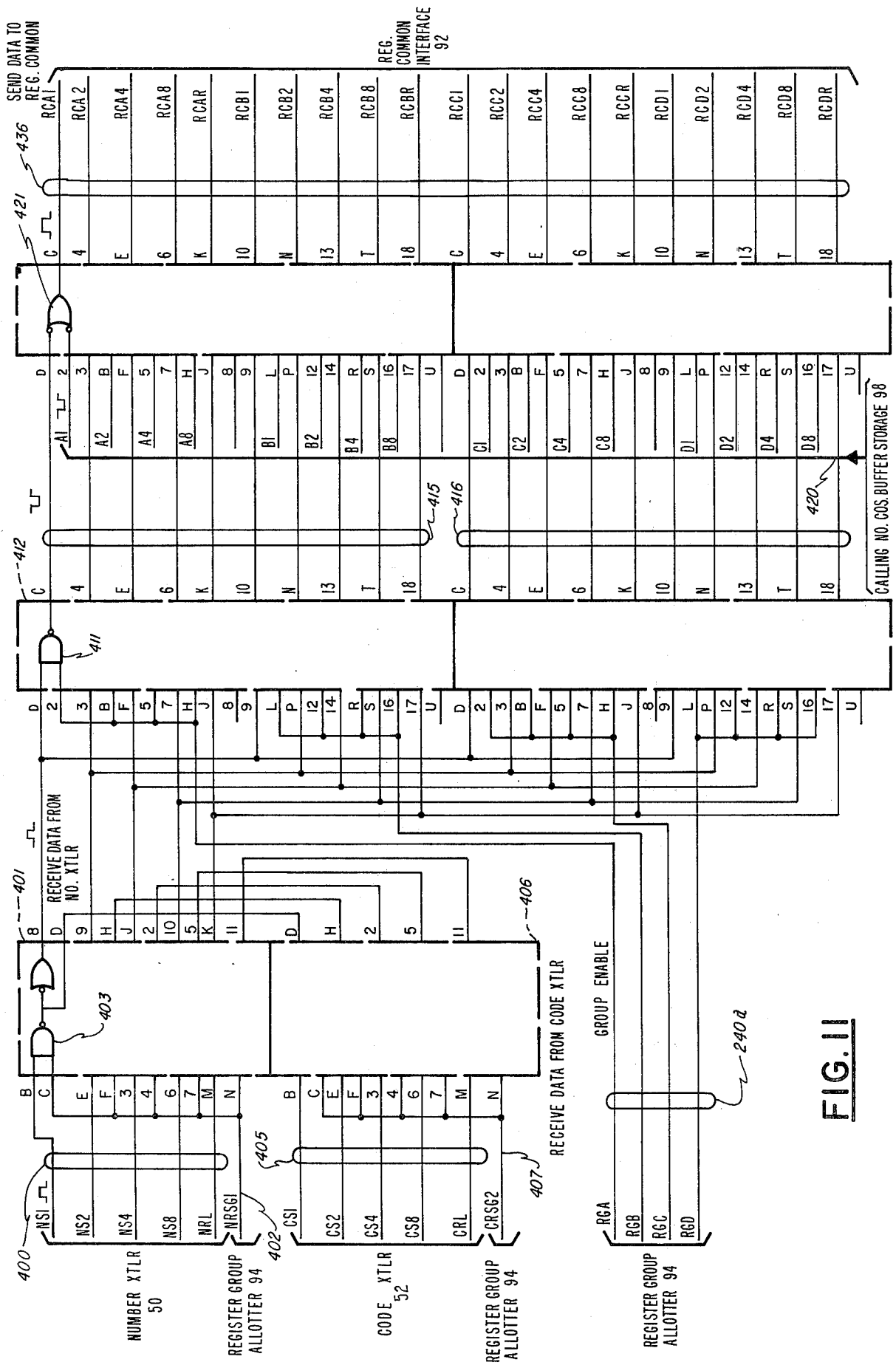
FIG. 11 is a schematic circuit diagram of a second portion of the number translator-code translator access circuit used in the call distributor circuit of FIG. 4.

FIGS. 10 and 11 — Number Translator-Code Translator Access 96

The output from lines 280a and 280b is applied to a subsequent series of logic gates in the number translator-code translator access circuit 96. Again, circuit 96a is associated with Super Group I and 96b is associated with Super Group II. The logic gates of FIG. 10 further converge the signals of the logic circuitry of FIG. 9.

The inputs in on lines 280a and 280b from Super Groups I and II, respectively, are first passed through inverters 312 and subsequently through AND gates 314. The AND gates 314 are supplied with enabling signals, applied from the register group allotter 94, over lines 220a, 220b and 221a, 221b. In the logic circuitry 96a, the signals impressed on line 220a are associated with the register groups of Super Group I and with the number translator 50 (via the call distributor 91 of FIG. 3). On the other hand, signals impressed on line 220b are associated with the register groups of Super Group II and with the number translator 50 (via the distributor 91b of FIG. 3).

The signal impressed over line 221a in circuit 96a is associated with the code translator 52 and Super Group I. The signal impressed on line 221b of circuit 96b relates to Super Group II and is associated with the code translator 52.

When a high signal is present on line 220a, a low signal is present on lines 221a and 220b and a high signal is present on line 221b. A high signal on a line 220 enables the the corresponding Super Group to transmit data to the number translator 50 and a high signal on a line 221 enables the corresponding Super Group to transmit data to the code translator 52. A low signal on a line 220 or 221 inhibits signals from being transmitted from the corresponding Super Group to the number translator 50 or code translator 52.

The ouputs of the AND gates 314 relate, either to the number translator 50, in which case outputs are on lines 315a or 315b, respectively, or to the code translator 52, in which case the outputs are on lines 316a or 316b, respectively. Again there is an either/or situation, so that one of sides 96a and 96b of the circuit produces an output to the number translator 50 and the other produces an output to the code translator 52. The outputs 315 and 316 are passed through an inverter 317 to produce highs on lines 318 that send data to the number translator 50 and highs on lines 319 to send data to the code translator 52.

Referring now to FIG. 11, further logic circuitry for the number translator-code translator access is shown. The circuitry of FIG. 11 receives data from the number translator 50 and code translator 52. Only one half of the circuit is shown. There is another half of the circuit identical to the first half. For purposes of illustration, the half of the circuit shown in FIG. 11 relates to Super Group I and, therefore, is associated with register groups A, B, C and D and number translator 50 and code translator 52. The other half of the circuit which is not shown, is concerned with Super Group II, in other words, with registers E, F, G and H and also with number translator 50 and code translator 52.

Referring now to the illustrated Super Group I side of the circuit shown in FIG. 11, the number translator 50 inputs over lines 400 to a plurality of gates 401, while an enabling signal from the register group allotter 94 inputs over line 402 to enable AND gates 403 in the gating circuit 401. The code translator 52 inputs over lines 405 to a gating circuit 406, while a code translator register group enabling signal is impressed over line 407 to enable AND gates within gating circuit 406. The outputs from the gating circuits 401 and 406 are then combined with group enable signals on lines 240a from the register group allotter circuit 94 (FIG. 8) and applied to AND gates 411 in a gating circuit 412. The lines 408 are associated with the four register groups A, B, C and D of Super Group I.

The outputs of AND gates 411 on lines 415 and 416 are then combined with the outputs 420 from the calling number-class of service buffer storage 98 and gated through NAND gates 421 to produce a high output on lines 436. The output on lines 436 is then passed back through the register common interface 92 to the register groups A, B, C, and D. It should be kept in mind that FIG. 11 represents Super Group I and the substantially identical arrangement for Super Group II is not shown. In practice, the enabling signals alternate (for received data from the number translator 50 and code translator 52) between Super Groups I and II, while indexing the register groups A-H associated with each super group.

Figure 12:
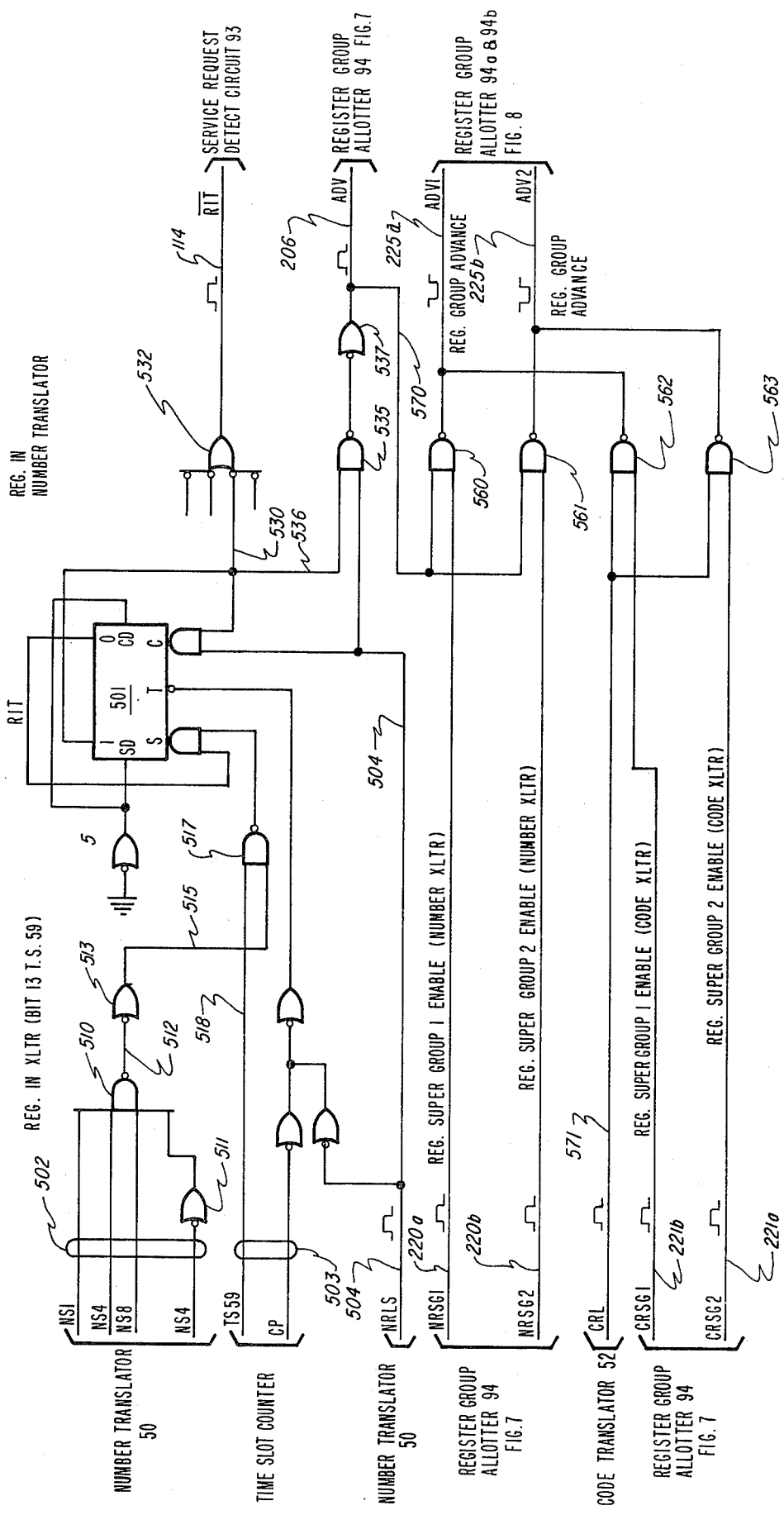
FIG. 12 is a schematic circuit diagram of a second portion of the service request detect circuit used in the call distributor of FIG. 4.

FIG. 12 — Service Request Detect Circuit 93 (2nd Portion)

Referring now to FIG. 12, where a 2nd portion of the service request detect circuit 93 is shown, a flip-flop 501 is supplied within data inputs 502 from the number translator 50, inputs 503 from the time slot counter and a simultaneous enabling and resetting input 504 from the number translator 50. The signals on lines 502 inform the circuit that a particular subregister is seized and that it is the register with which the circuit is now concerned. Only one register is served at a time, during a particular time slot. An AND gate 510 cooperates with gate 511 to provide an identifying number on line 512. The signal on line 512 is inverted by inverter 513 and applied over line 515 to AND gate 517, along with a time slot signal on line 518. When the register is flagged or seized during the time slot impressed on line 518, the AND gate 517 sets the flip-flop 501. The flip-flop 501 has an output on line 530, which is applied to an OR gate 532 to produce a signal on line 114. The signal on line 114 indicates that there is a register in the translator, and the signal is sent through line 114 of the first portion of the service request detect circuit 93, shown in FIG. 5. The signal on line 114 indicates to the first portion of the circuit 93 in FIG. 5, whether or not the number translator 50 is idle. If the signal is high, then the number translator 50 is idle. If the signal is low, then the number translator 50 is not idle. If the translator is idle, then the call distributor 91 will accept a call, in the particular register group considered. If the translator is not idle then the call will be switched to another register group.

After the number translator 50 has finished its work, a high release signal is transmitted via line 504 and is applied to NAND gate 535, along with a signal on line 536 from the flip-flop 501. This produces an output, which is inverted by inverter 537 to produce a high that is applied over line 206 back to the register group allotter circuit 94 of FIG. 7, which causes the register group allotter to advance to the next register group.

The super group of the register which will be advanced by the high signal on line 206 is identified by signals on lines 225a and 225b that are connected to the register group allotter circuits 94a and 94b, respectively of FIG. 8.

The signal on line 225a is controlled by a pair of NAND gates 560 and 561 while the signal on line 225b is controlled by a pair of NAND gates 562 and 563. NAND gates 560 and 561 each receive a high pulse from line 570 when line 206 is pulsed high. Connected to NAND gate 560 is line 220a from the register group allotter circuitry 94 of FIG. 7. When line 220a receives a high signal from the register group allotter 94 the NAND gate 560 has a low output which advances the register group counter of Super Group I. On the other hand, when there is a high on line 220b from the register group allotter 94, NAND gate 561 impresses a low signal on line 225b which advances the register group counter of Super Group II.

When there has been a high release signal on line 571 from the code translator 52 similar to the high signal on line 206, the NAND gates 562 and 563 will apply low pulses to lines 225a and 225b, respectively, depending on which line of lines 221a or 221b has a high signal thereon, and to advance the register group counter of Super Group I and II, respectively. Lines 221a and 221b are from the register group allotter circuitry 94 of FIG.

7 and are associated with the code translator 52 and Super Groups I and II respectively.

In considering FIG. 12 in conjunction with FIG. 7, it is seen that the lines 225a and 225b are alternately pulsed by enabling signals on lines 220 and 221 from the register group allotter circuitry 94 of FIG. 7. In considering FIG. 8 in conjunction with FIG. 12, it is seen that the register group allotter circuitry 94a is activated by a low pulse on line 225a advancing one register of the register groups A, B, C and D of Super Group I while circuitry 94b is activated by a low pulse on line 225b advancing one register of the register groups E, F, G and H.

From FIG. 8 it is seen that the register groups in Super Group I and Super Group II advance alternately, as the lines 225a and 225b are alternately pulsed.

In summarizing the operation of the circuit 93 of FIG. 12 the outputs on lines 114, 225a, and 225b of the circuit 93, are controlled so as to first indicate whether the number translator 50 is idle. If the number translator is idle then a pulse on line 206 tells the register group allotter circuitry of FIG. 8 to advance one register group and the pulses on lines 225a and 225b determine which register group will be advanced. The pulses on lines 225a and 225b alternate so that first, one super group and then the other is served. The particular register group, within each super group being served, is identified by outputs 240 from the register group allotter circuit 94, shown in FIG. 8. When a local call in one super group is matched with a trunk call in the other super group, then both calls are terminated simultaneously.

Figure 13:
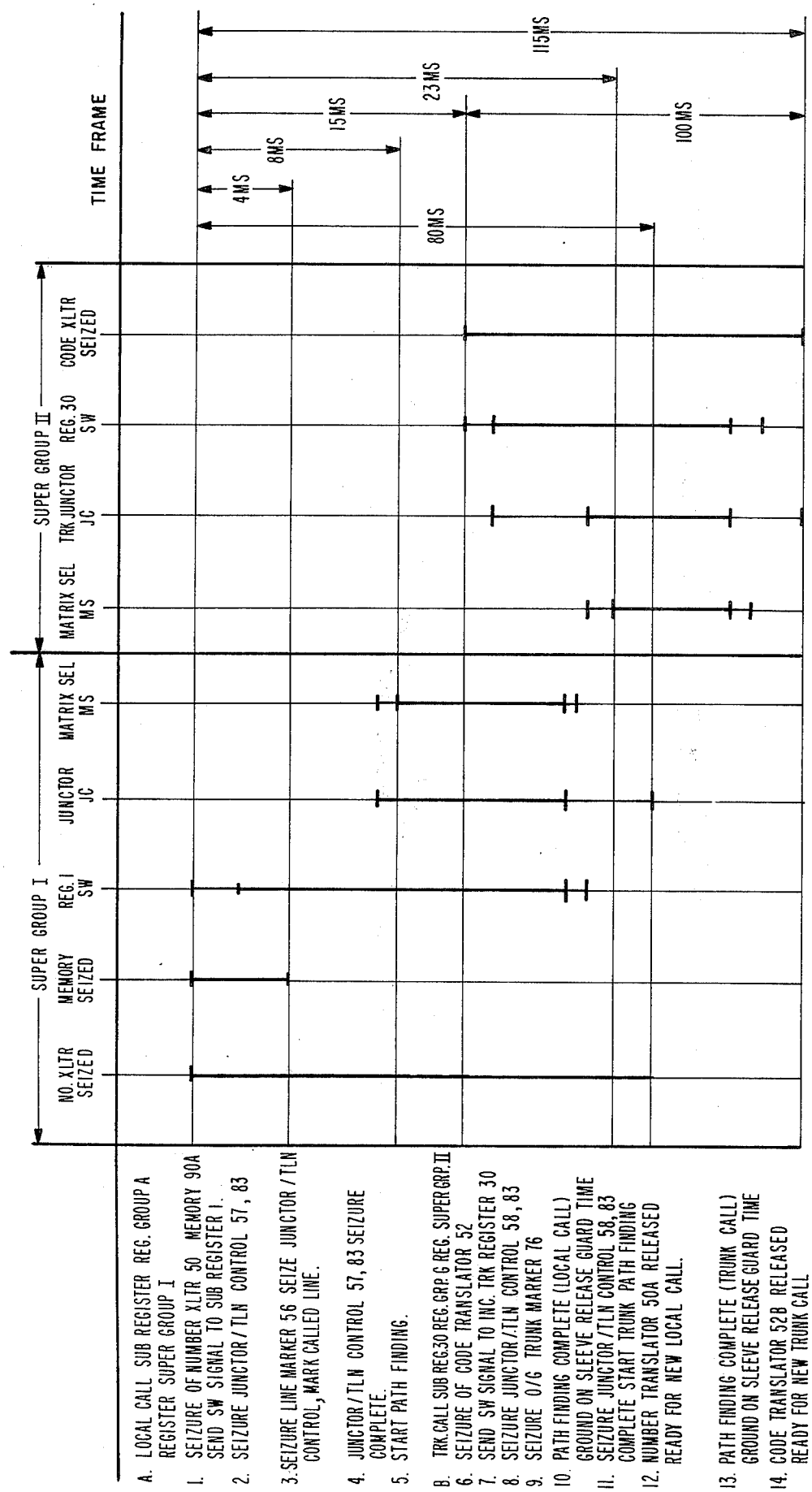
FIG. 13 is a chart illustrating a series of circuit functions with respect to a time frame.

FIG. 13 — Example of Dual Call Termination

Since the register groups A-H are arranged in Super Groups I and II and since portions of the circuitry of the switching system 20 are divided into two interconnected sections, both a number translation and a code translation can be effected simultaneously which means that two telephone calls can be terminated simultaneously or within a time interval in which both translations occur. It does not matter which translation request occurs first as long as the translation requests overlap during the selected time period.

Referring now to FIG. 13, a sequence chart is shown presenting a graphical example of dual telephone call termination in which circuit functions in Super Groups I and II are performed in reference to a time frame. This sequence chart represents an unfavorable condition in which the code translation request is made 15ms after the number translation request. In actual practice the time intervals have been found to be shorter than those represented in the chart.

As shown in FIG. 3, the actual termination of the local and trunk calls proceeds as set forth in the description of FIG. 2 once the number and code translations have been requested.

The foregoing description and examples are merely illustrative of the invention which is limited only by the following claims.

What is claimed is:

1. An electronic telephone switching system for processing any of: (i) calls of the local type between local termini, (ii) calls of the outgoing trunk type between a local terminus and a terminus of a remote telephone switching system, and (iii) calls of the tandem trunk type between termini of two different remote telephone switching systems, comprising:

first and second line-link network groups, each of said groups comprising a plurality of line units, said line units providing paths between local subscribers and the system;

a first controls organization associated with said first and second line-link network groups, said first controls organization including: (I) a line marker, (II) service link network controls, and (III) a plurality of local registers;

a plurality of incoming trunks for providing paths between remote telephone switching systems and the system;

a second controls organization associated with the plurality of incoming trunks, said second controls organization including: (A) a plurality of incoming trunk scanner and incoming trunk marker circuits, (B) a plurality of trunk service link network controls, and (C) a plurality of trunk registers;

first and second originating trunk-link network groups for establishing paths for cells which have entered the system through said first and second line-link network groups, respectively, and for calls which have entered the system through said plurality of incoming trunks;

one and another terminating trunk-link network groups which are selectively transposable in their connection to said first and second originating trunk-link network groups, said one and another terminating trunk-link network groups being operative to establish paths to either of local termini or termini of remote telephone switching systems depending upon the type of call;

a first junctor/trunk line network control operatively associated with said first line-link network group, said first originating trunk-link network group, and whichever of said one and another terminating trunk-link network groups is connected to the output of said first originating trunk-link network group;

a second junctor/trunk link network control operatively associated with said second line-link network group, said second originating trunk-link network group, and whichever of said one and another terminating trunk-link network groups is connected to the output of said second originating trunk-link network group;

a number translator circuit to provide number translation for calls which terminate locally;

a code translator circuit to provide code translation for calls which terminate at an outgoing trunk;

said plurality of local registers being operatively connected to either one or the other of: (1) said number translator circuit, and (2) said code translator circuit, depending upon whether an originating local subscriber dialed a local call or an outgoing trunk call, said plurality of local registers being operative to temporarily store information for completing the terminating portion of a telephone call;

said plurality of trunk registers being operatively connected to either one or the other of: (a) said number translator circuit, and (b) said code translator circuit, depending upon whether a call originator dialed a local call or an outgoing trunk call, said plurality of trunk registers being operative to temporarily store information for completing the terminating portion of a telephone call;

a first group of said plurality of local registers and a first group of said plurality of trunk registers comprising a first supergroup of registers operatively associated with said first line-link network group and said first originating trunk-link network group;

a second group of said plurality of local registers and a second group of said plurality of trunk registers comprising a second supergroup of registers operatively associated with said second line-link network group and said second originating trunk-link network group;

register groups allotter means for alternating between those individual registers of one of said first and second supergroups that contain information for calls which terminate locally and those individual registers of another of said first and second supergroups that contain information of calls which terminate at an outgoing trunk, said group allotter means being operative to match a locally originating-locally terminating call temporarily stored in one of the first and second supergroups of registers with a locally originating-outgoing trunk call temporarily stored in the other of said first and second supergroups of registers; and means for completing termination of the matched locally originating-locally terminating and locally originating-outgoing trunk calls within a time frame which includes the temporary storage of both the locally originating-locally terminating and the locally originating-outgoing trunk calls within the respective supergroups in which they are stored, said means for completing termination including: (i) said first and second controls organizations, and (ii) said first and second junctor/trunk link network controls.

2. In an electronic switching system, the combination comprising:

first and second line-link network groups, each of said groups comprising a plurality of line units, said line units providing paths between local subscribers and the system;

a plurality of local registers operatively associated with said first and second line-link network groups;

a plurality of incoming trunks providing paths between remote telephone switching systems and the system;

a plurality of trunk registers operatively associated with said plurality of incoming trunks;

first and second originating trunk-link network groups for establishing paths for calls which have entered the system through said first and second line-link network groups, respectively, and for calls which have entered the system through said plurality of incoming trunks;

one and another terminating trunk-link network groups which are selectively transposable in their connection to said first and second originating trunk-link network groups, said one and another terminating trunk-link network groups being operative to establish paths to call termini;

number translator means for translating calls which terminate locally;

code translator means for translating calls which terminate at an outgoing trunk;

said plurality of local registers being operatively connected to either one or the other of: (I) said number translating means, and (II) said code translating means, depending upon whether the originating local subscriber dialed a local call or an outgoing trunk call, said plurality of local registers being operative to temporarily store information for completing the terminating portion of a phone call;

said plurality of trunk registers being operatively connected to either one or the other of: (A) said number translating means, and (B) said code translating means, depending upon whether the call originator dialed a local call or an outgoing trunk call, said plurality of trunk registers being operative to temporarily store information for completing the terminating portion of a phone call;

means for monitoring the plurality of local registers and the plurality of trunk registers to identify a pair of calls comprising a locally originating-locally terminating call which originated in one of said first and second line-link network groups and a locally originating-outgoing trunk call which originated in the other of said first and second line-link network groups; and means for terminating the identified pair of calls within a time frame which includes temporary storage of both the locally originating-locally terminating and the locally originating-outgoing trunk calls within the respective registers in which they are stored, said means for terminating the identified pair of calls providing the calls termination in cooperation with: (1) said first line-link network groups, (2) said first originating trunk-link network groups, and (3) whichever of said one and another terminating trunk-link network groups is connected to the output of said first originating trunk-link network groups for a given call, and in cooperation with: (a) said second line-link network groups, (b) said second originating trunk-link network groups, and (c) whichever of said one and another terminating trunk-link network groups is connected to said second originating trunk-link network groups for a given call.

* * * * *